(12) United States Patent
Tucker

(10) Patent No.: US 9,117,091 B2
(45) Date of Patent: Aug. 25, 2015

(54) SYSTEM AND METHOD FOR SECURING VIRTUAL COMPUTING ENVIRONMENTS

(75) Inventor: Mark Lowell Tucker, Kirkland, WA (US)

(73) Assignee: Temporal Defense Systems, LLC, Renton, WA (US)

( * ) Notice: Subject to any disclaimer, the term of this patent is extended or adjusted under 35 U.S.C. 154(b) by 89 days.

(21) Appl. No.: 13/882,478

(22) PCT Filed: Oct. 28, 2011

(86) PCT No.: PCT/US2011/058421
§ 371 (c)(1),
(2), (4) Date: Apr. 29, 2013

(87) PCT Pub. No.: WO2012/058613
PCT Pub. Date: May 3, 2012

(65) Prior Publication Data
US 2013/0212709 A1    Aug. 15, 2013

Related U.S. Application Data

(60) Provisional application No. 61/408,607, filed on Oct. 31, 2010.

(51) Int. Cl.
| *G06F 7/04* | (2006.01) |
| *G06F 17/30* | (2006.01) |
| *H04N 7/16* | (2011.01) |
| *G06F 21/64* | (2013.01) |
| *G06F 21/55* | (2013.01) |
| *G06F 21/56* | (2013.01) |
| *G06F 9/455* | (2006.01) |

(52) U.S. Cl.
CPC .............. *G06F 21/64* (2013.01); *G06F 21/55* (2013.01); *G06F 21/554* (2013.01); *G06F 21/56* (2013.01); *G06F 2009/45587* (2013.01)

(58) Field of Classification Search
CPC ................. G06F 9/45558; G06F 2009/45562; G06F 2009/45575; G06F 2009/45587
USPC ................................................ 726/29, 22–25
See application file for complete search history.

(56) References Cited

U.S. PATENT DOCUMENTS

| 7,908,653 | B2 * | 3/2011 | Brickell et al. | 726/22 |
| 8,307,443 | B2 * | 11/2012 | Wang et al. | 726/24 |
| 2006/0242704 | A1 * | 10/2006 | Aviani et al. | 726/23 |
| 2009/0055927 | A1 * | 2/2009 | Gowdru et al. | 726/22 |
| 2009/0169017 | A1 * | 7/2009 | Smith et al. | 380/278 |
| 2011/0010710 | A1 * | 1/2011 | Thrush et al. | 718/1 |
| 2011/0047620 | A1 * | 2/2011 | Mahaffey et al. | 726/23 |
| 2011/0078797 | A1 * | 3/2011 | Beachem et al. | 726/25 |

OTHER PUBLICATIONS

Jacob R. Loch et al. "SAV-V: Securing Anti-Virus with Virtualization," Microsoft Research TechReport, Apr. 2007.*
"Anti-Virus Practices for VMware View," VMware, Inc., 2011.*

* cited by examiner

*Primary Examiner* — Dede Zecher
*Assistant Examiner* — Vadim Savenkov
(74) *Attorney, Agent, or Firm* — Cooley LLP

(57) ABSTRACT

A computer implemented method includes introducing unpredictable temporal disruptions to the operating states of an authorized process and an unauthorized process. The authorized process is migrated to a virtual machine to avoid the unpredictable temporal disruptions while the unauthorized process is subject to the unpredictable temporal disruptions and thereby experiences an unstable environment that induces operating faults.

19 Claims, 19 Drawing Sheets

Temporal Defense Layer

Instantiation Procedure Flow Chart

FIG. 7 — Termination Procedure Flow Chart

Integrity Check Procedure
Flow Chart

FIG. 11 — Temporal Migration Procedure Flow Chart

Temporal Scheduler Procedure Flow Chart

Synthesized Production System Used In Live Forensics Diagram

Real-time Countermeasures Example Flow Chart

| VM base Image ID | Hardware ID | VM Digital Identity | VM base Image Blob |
|---|---|---|---|
| 100 | 23 | 12030237841 | 0012ff5C |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

Data Configuration Showing A Base Virtual Machine Image Record In The Archive

FIG. 16

| Authorized Process ID | VM base Image ID | Process Filename | Authorization Hash | Process Executable Blob |
|---|---|---|---|---|
| 1 | 100 | inetpub.exe | 567121001 | 0012FF54 |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Data Configuration Showing An Authorized Process Entry In The Registry

FIG. 17

Deriving A Process's Authorization Identity Hash Flow Chart

Deriving A Virtual Machine's Digital Identity Flow Chart

SYSTEM AND METHOD FOR SECURING VIRTUAL COMPUTING ENVIRONMENTS

CROSS REFERENCE TO RELATED APPLICATIONS

This application claims priority to International Patent Application no. PCT/US2011/058421 filed Oct. 28, 2011, entitled "System and Method for Securing Virtual Computing Environments", which claims priority to U.S. Provisional Patent Application No. 61/408,607 filed Oct. 31, 2010. The content of each application is incorporated herein by reference.

FIELD OF THE INVENTION

The present invention relates to computer security. More particularly, the invention relates to securing computer devices and networks against unauthorized access and use.

BACKGROUND OF THE INVENTION

Today's computer devices and networks are incredibly insecure as the complexity of the systems has increased rapidly as computing technology innovations have been rushed to completion to satisfy market demand in a hyper competitive industry. Security, in most commercial devices and networks has been added as an afterthought as engineering focus and resources have traditionally been on the functionality and problem the innovation solves. The result has been fantastic, making computer devices and network access ubiquitous on a global basis. However, in the process of developing this ubiquity, security of computer devices and the networks that connect them together is completely insufficient leaving most systems vulnerable to cyber attacks and computer viruses.

The problems with computing device and network security at present are that the measures in place to stop unauthorized access to machines and prevent unauthorized code from being run on the systems is inadequate as the breadth and complexity of the code bases cannot be protected by the current best practices computing environment. Even with the addition of security policy and procedures coupled with security measures such as passwords and secure access authentication, systems are still not secure enough. In fact, even when systems include specialized security products such as state of the art VPNs, IDSs, firewalls and anti-virus software systems can be broken into without much effort. By simply downloading the latest open source hacker software and pointing it to the target, in many cases even a non-programmer can gain access and computing devices can be compromised in mission critical systems. As a result an ocean of system security patches exists and more wash up on shore every day.

SUMMARY OF THE INVENTION

A computer implemented method includes introducing unpredictable temporal disruptions to the operating states of an authorized process and an unauthorized process. The authorized process is migrated to a virtual machine to avoid the unpredictable temporal disruptions while the unauthorized process is subject to the unpredictable temporal disruptions and thereby experiences an unstable environment that induces operating faults.

BRIEF DESCRIPTION OF THE FIGURES

The invention is more fully appreciated in connection with the following detailed description taken in conjunction with the accompanying drawings, in which:

FIG. 16 is an example of a data configuration showing a base virtual machine image as stored in an archive;

FIG. 17 is an example of a data configuration showing a registered process in the authorized process registry;

Like reference numerals refer to corresponding parts throughout the several views of the drawings.

DETAILED DESCRIPTION OF THE INVENTION

Figure 1:
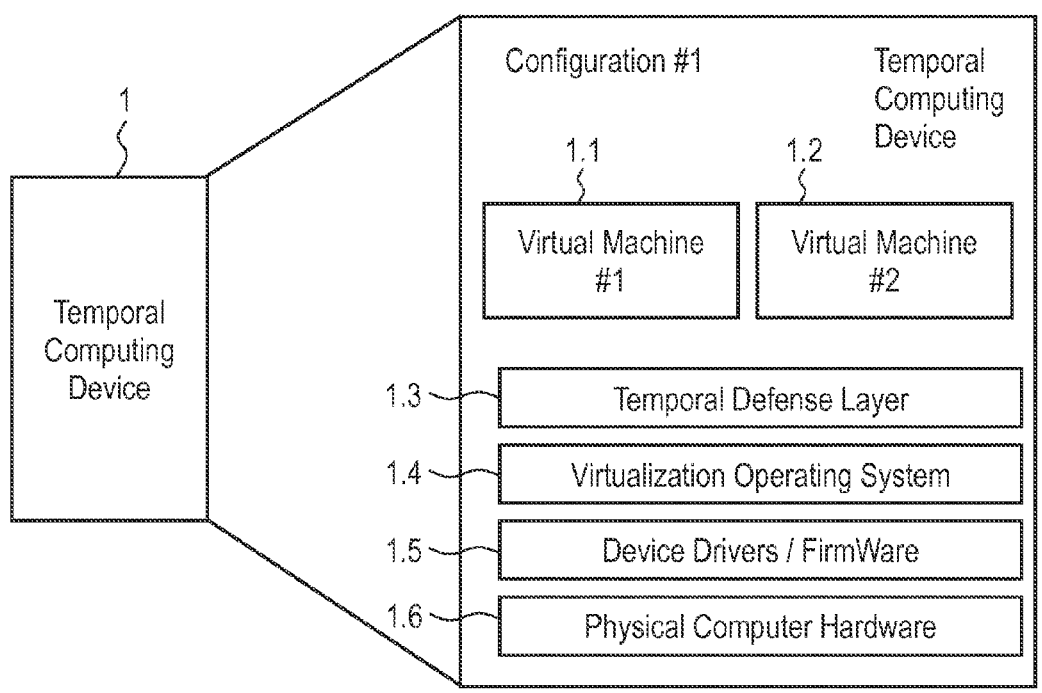
FIG. 1 is a stack diagram showing the configuration of a computing device according to an embodiment of the invention.

The present invention is designed to create a temporal computing environment in which authorized process use occurs in a robust stable computing environment and unauthorized process use experiences a hostile, unstable ever changing computing environment. In addition, the present invention provides mechanisms that blur, mask or confound the system specifications to unauthorized or compromised computing processes and their controllers (people or remote agents that initiated or control the processes).

Furthermore, the present invention provides a technique for integrity validation of system instances both virtual and physical that detects if the system is compromised. In addition, the present invention provides a method of quarantine of infected systems to prevent virus spread, access to mission critical commands and an autopsy method to conduct forensics in a way that doesn't affect the production computing environment or alert the virus, unauthorized agent code or unauthorized computing session user or their controllers to the fact that they are being quarantined or operating in a synthetic, pseudo environment and not the production environment.

That is, according to an aspect of the current invention, there are computing environment entities that are virtualized on the computing device or computing network apparatus that are distinct computing systems such that they act as synthetic computing devices. An operating instance of the virtual computing or network systems is referred to as a virtual machine or VM, which operates in accordance with the operating system which governs the computing environment for each distinct virtual machine. This aspect provides a method to control the virtual machines running in a virtualized computing environment in such a manner as to induce a temporal state in which authorized processing tasks executing in a virtual machine are unaffected but unauthorized processes encounter a change to their computing environment.

In one embodiment, processing includes: (a) creating a snapshot, base digital representation, of a virtual machine in such a way as to capture the base state of the virtual machine so that multiple instances can be instantiated; (b) support bringing the virtual machines up (booting up the virtual machine's computing environment) and down (shutting down the virtual machine's computing environment) frequently on a predefined interval or random basis; (c) while migrating the processes from one virtual machine to another in a manner so as to not interrupt the normal or intended execution of authorized processes but for unauthorized processes during migration their execution is terminated or altered based on security rules.

Another aspect of the current invention is to periodically conduct an integrity check of the virtual machine through a validation method. One embodiment of the validation method includes (d) creating a unique value for a base digital representation that represents a sound uncompromised virtual machine, the integrity value of the base digital representation; (e) computing the integrity value of an active virtual machine, referred to as the active virtual machine integrity value; and (f) comparing the integrity value of the base digital representation against the active virtual machine integrity value.

Yet another aspect of the current invention is to confound an unauthorized process so that it doesn't know the true computing environment specifications, such as the operating system, the networking protocols or the accessible peripherals, (collectively the systems core components) of the virtual machine to provide a method for misdirection. In one embodiment, this method of misdirection includes (g) initiating a registered authorized process that receives a unique system inquiry authorization code; (h) using the authorization code to override system discovery used by the operating system to determine the computing environment specifications; (i) when a process makes an inquiry into the computing environment the process is checked to see if it is registered and is using its assigned inquiry authorization code; (j) if yes, then the true specification is provided; (k) if no, then a pseudo specification is provided which may not be the true specification.

Another aspect of the current invention is to reduce the damage an unauthorized process can cause by providing a quarantine method, which isolates and contains unauthorized processes in a manner that protects the computing device and related networks and systems while not alerting the unauthorized process that it has been detected. This quarantine method may include: (l) if the above described step (f) integrity check fails the virtual machine is marked as potentially compromised putting the virtual machine in an active quarantine state; (m) no processes on the virtual machine are stopped but accessibility to computing resources and networks and systems is limited; (n) when the quarantined virtual machine is end-of-lifed, terminated (step b), the instance can be terminated however its virtual machine snapshot is saved for forensic analysis; (o) or the end-of-life quarantined virtual machine can continue to execute outside the production computing environment in a manner that allows the unauthorized process to continue to run for live forensic analysis, experimentation, infection rate analysis or malicious code target discovery; (p) lifting the quarantine limitations but operating on a synthesized pseudo-system. Thus protecting the system but providing the illusion of non-detection and success for unauthorized processes.

Another aspect of the current invention is dynamic countermeasure adjustment so that the temporal state system can take into account it is under attack or has been attacked and adjust its defenses accordingly through a method of adaptable defense. This adaptable defense method may include: (q) identify and categorize the unauthorized processes; (r) providing a threat level quantification to an unauthorized process; (s) determine the countermeasure approach based on the security rules of the temporal security layer; (t) if set to passive there is no change to temporal controlling processes; (u) if set to protect against then the system specifications camouflaging (step t) is adjusted accordingly; (v) if set to entice then the system specifications camouflaging (step t) is adjusted accordingly, effectively making the system a honey pot to attract more unauthorized processes.

According to an example of the present invention, in the above step (a), a registry of authorized processes is generated. During process migration, in the above step (c), the execution state of the authorized processes is recorded and execution is suspended on the host virtual machine when the newly instantiated virtual machine, in the above step (b), becomes operational (the new host) the suspended processes are started on the new host and their states of execution at startup are set to their respective recorded execution state on the now old host and the processing of the suspended processes resume execution on the new host virtual machine. Process migration can happen near instantaneously as the new virtual machine can be instantiated and fully operational before execution of the process is suspended on the soon to be old host allowing a seamless processing handoff between active virtual machines.

Further, when process migration occurs in the above step (c), an unauthorized process is terminated by the natural course of the new virtual machine instantiation as described in the above step (b), as the natural definition of a unauthorized process is a process that is not registered in the authorized registry of the base virtual machine therefore when a new instantiation of the base virtual machine image is created unauthorized processes are not started so in essence they are terminated on the old host virtual machine at the point of process suspension.

Alternatively, according to another example of the present invention based on security rules unauthorized processes can be kept alive during migration when process migration occurs in the above step (c). When this occurs during the virtual machine termination process described in the above step (b), instead of terminating the old host virtual machine, the virtual machine is marked as being quarantined, if it has not been already, and a third instantiation of the base virtual machine is created that is marked as quarantined and put in a living forensics state as described in the above step (o), one which utilizes a synthetic computing, network and system environment so that the quarantined living forensics state does not effect the production environment but keeps the unauthorized processes along with the authorized processes now running in a synthetic environment alive and executing. Then the old virtual machine state including the process state of unauthorized process is copied to the third instance of the base virtual machine running in quarantined living forensics mode, once the state is duplicated the process suspension is lifted on the third virtual machine and execution continues seemingly as normal but in the synthetic environment as described in the above step (o). This also can utilize the seamless process handoff method described above. After both the migration process and the quarantined living forensics handoff processes are complete the old virtual machine has a final snapshot taken of its state including the final process state and it is stored for further analysis as in the above step (n), once this is complete it is terminated as described in the above step (b).

According to another example of the present invention an integrity check is conducted periodically ensure the virtual machine's computing environment integrity. During the above step (a) of creating a base virtual machine a unique value is generated as described in the above step (d) by computing a digital signature of the base virtual machine. This digital signature is used during integrity checking as it is used as the comparison against an active instantiation of the base virtual machine. As set forth in the above step (e), the virtual machine can run through the same digital signature generation function and if the integrity value that is output matches as described in the above step (f), the digital signature of the base virtual machine image then integrity of the virtual machine can be assumed.

Further, if the integrity comparison fails, the virtual machine being checked is marked as quarantined as explained in the above step (l), which limits process access as set forth in the above step (m), until the next migration process as described in the above step (c), which at completion the newly instantiated virtual machine that received the migration handoff is set to an integrity valid state and the quarantine is lifted. Depending on the security rules the old virtual machine has its snapshot taken and is saved for further forensics study as set in the above step (n), and depending again on the security rules if live forensics is set the quarantined virtual machine follows the above step (o).

According to another example of the present invention a camouflaging confounding process is used to confuse and mask the true specifications of the computing environment. As described in the above step (g), at the time of process registry a hash code is generated from the processes executable code. When a call is made from an executing process to the operating system as in the above step (i) to change or inquire about system specifications the process's inquiry authorization hash is used as an override determination value. If the authorization hash is not present or the authorization hash does not match the one stored in the process registry for the calling process as laid out in the above step (k) then a fictitious system specification value may be returned; the value depends on the security rules. If the process inquiry authorization hash does match then the true specification is returned as in the above step (j).

This processing makes the system more resilient against unauthorized process attacks, information gathering and helping to slow the spread of viruses. In fact, this improvement works against outside attack attempts and unintentional internally released unauthorized processes from an unsuspecting authorized user and is continually being enforced even if the unauthorized process has not been detected yet and the virtual machine is not flagged as being in quarantine.

Yet another example of the present invention is to dynamically modify its countermeasure defenses of the aforementioned camouflage subsystem, the quarantine subsystem and the live forensics subsystem by doing analysis on infected virtual machine snapshots and live forensic quarantines to determine the type of unauthorized process that was being executed as set forth in the above step (q). A threat level value in accordance with the above step (r) is given to the unauthorized process based on the category and its historic log activity and its current and active response to live quarantine monitoring and experimentation. Based on the security rules the countermeasures to unauthorized processes are altered as in the above step (s). If the security rule is passive as in the above step (t) the camouflaging results are not altered, if the security rule is set to protect as in the above step (u) the camouflaging results are skewed far from the true values and if the security rule is set to entice as in the above step (v) the camouflage results try to accommodate the unauthorized process to induce success and possibly attract others for monitoring and perpetrator identification purposes.

FIG. 1 is a stack diagram showing an example configuration of an embodiment of a computing system according to the present invention. In FIG. 1, the reference numeral 1 designates a temporal computing device, which can be any type of computing device such as a computer laptop, a mobile phone, a desktop computer, or a computer server whose computing environment state has been induced to be temporal, defined as dynamically changing and altered for unauthorized processes, to achieve improved security of the computing environment. By higher level of security what is meant is the ability of the computing environment to determine which processes are authorized, having been previously approved or designated to be executed by the computing device along with what users have permission to access the device.

The temporal computing device 1 has an associated configuration. In this embodiment the configuration includes a first virtual machine 1.1, a second virtual machine 1.2, a temporal defense layer 1.3, a virtualization operating system 1.4, device drivers and firmware 1.5 and physical computer hardware 1.6.

Figure 2:
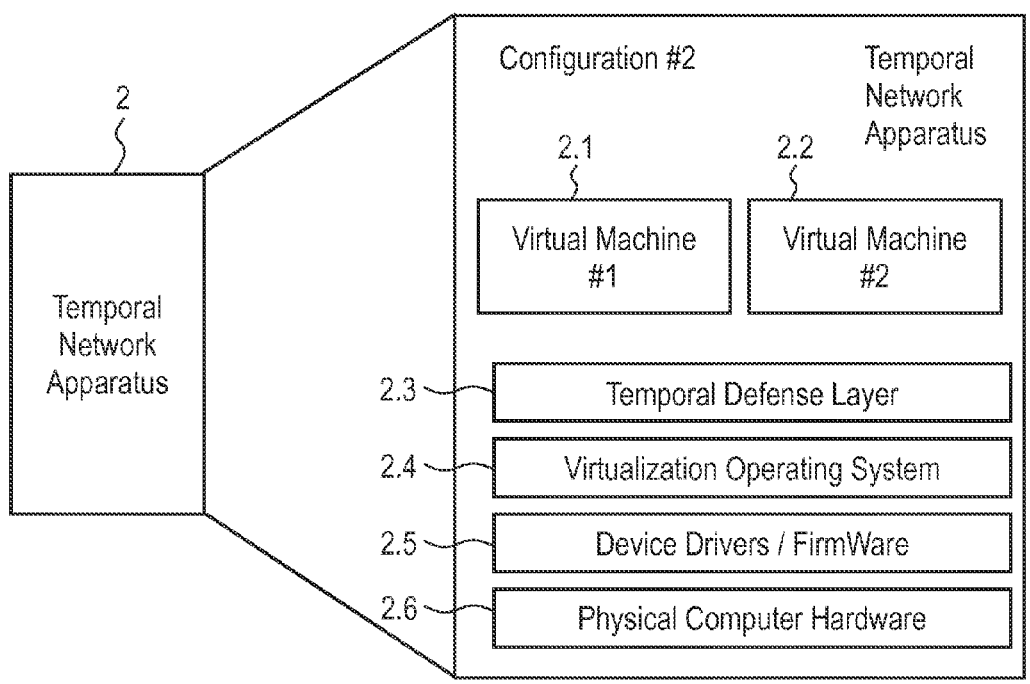
FIG. 2 is a stack diagram showing the configuration of a network apparatus according to an embodiment of the invention.

Similarly, in FIG. 2, the reference numeral 2 designates a variant embodiment that is a network apparatus, such as a router or a switch that has been induced to be temporal. FIG. 2 illustrates configuration components 2.1 through 2.6 of the type discussed in connection with FIG. 1.

Figure 3:
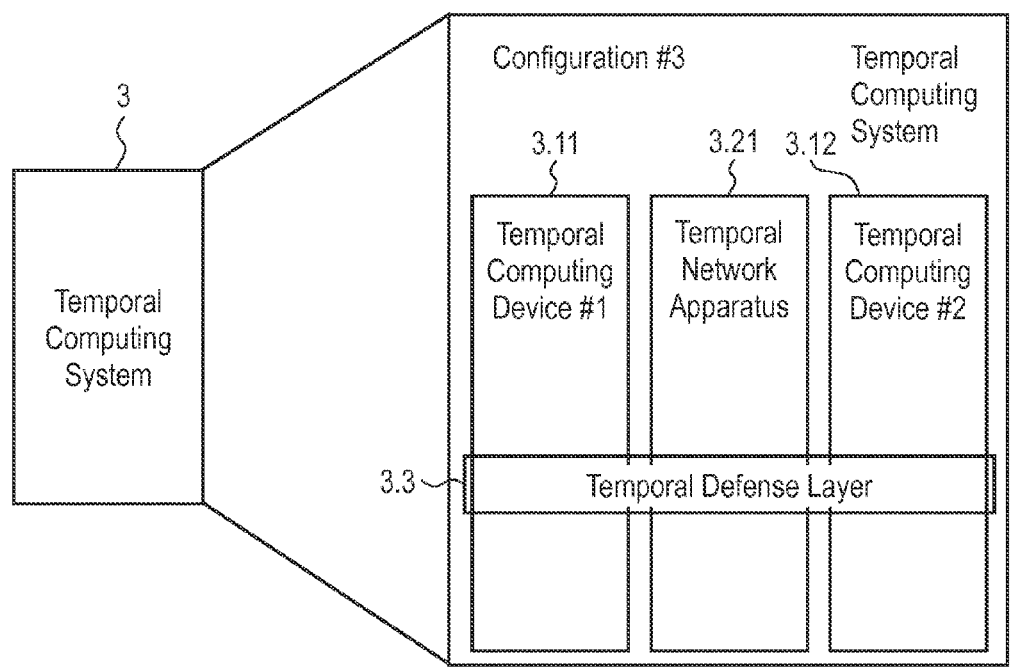
FIG. 3 is a stack diagram showing the configuration of a computing system according to an embodiment of the invention.

Expanding the computing environment complexity, in FIG. 3, the reference numeral 3 designates a computing system that is comprised of multiple computing devices and network apparatus that are connected together and share certain resources, such as a LAN (Local Area Network), which is induced to be temporal. In this embodiment, configuration of the temporal defense layer 3.3 can operate across all devices and apparatuses 3.11, 3.21 and 3.12 in a coordinated manner as depicted in FIG. 3.

Alternatively, each temporal device can operate its temporal defense layer independent of any other temporal devices in the system or any combination thereof. To be considered a temporal computing environment the minimum number of devices in a computing system that must be in an induced temporal state is one.

Figure 4:
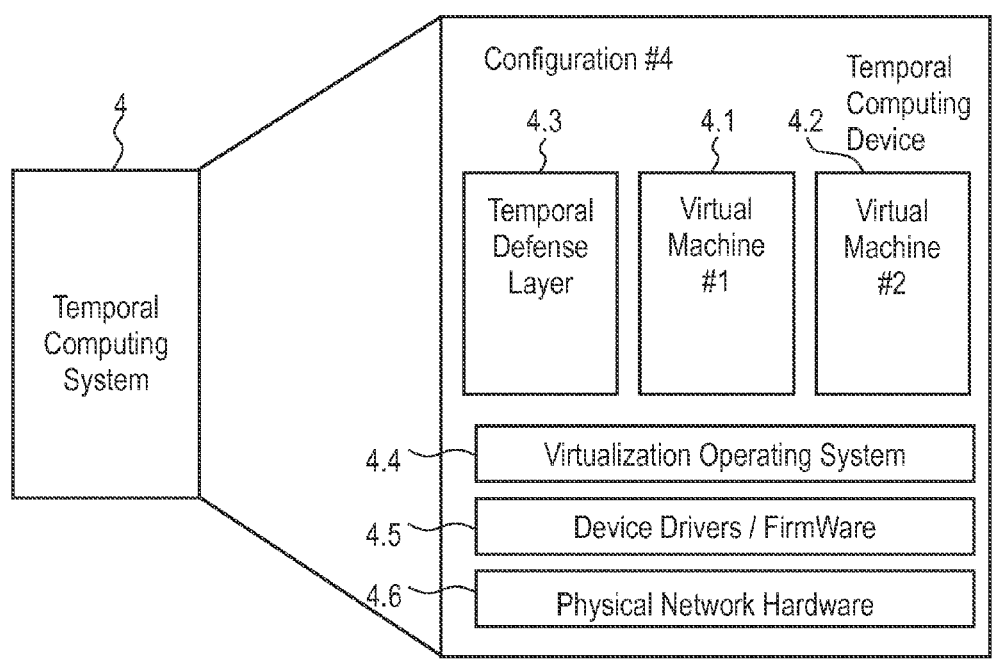
FIG. 4 is a stack diagram showing the decentralized configuration of an embodiment of a computer device according to an embodiment of the invention.

In FIG. 4, the reference numeral 4 designates another embodiment configuration in which a computing device is temporal. The difference between what is depicted in FIG. 1 and FIG. 4 is that the temporal computing layer in FIG. 1, the reference numeral 1.3 depicts the temporal computing layer executing centrally as part of the base virtualization operating system and in FIG. 4, the reference numeral 4.3 depicts the temporal computing layer executing decentralized as a designated virtual machine. In this configuration there can be more than one distinct temporal computing layer on a single computing device or network apparatus each set to control temporality in different designated virtual machines such as depicted with reference numeral 4.1. Embodiments of the invention can take many forms, including nested virtual machines that seemingly re-virtualize or temporalize virtual machines.

Figure 5:
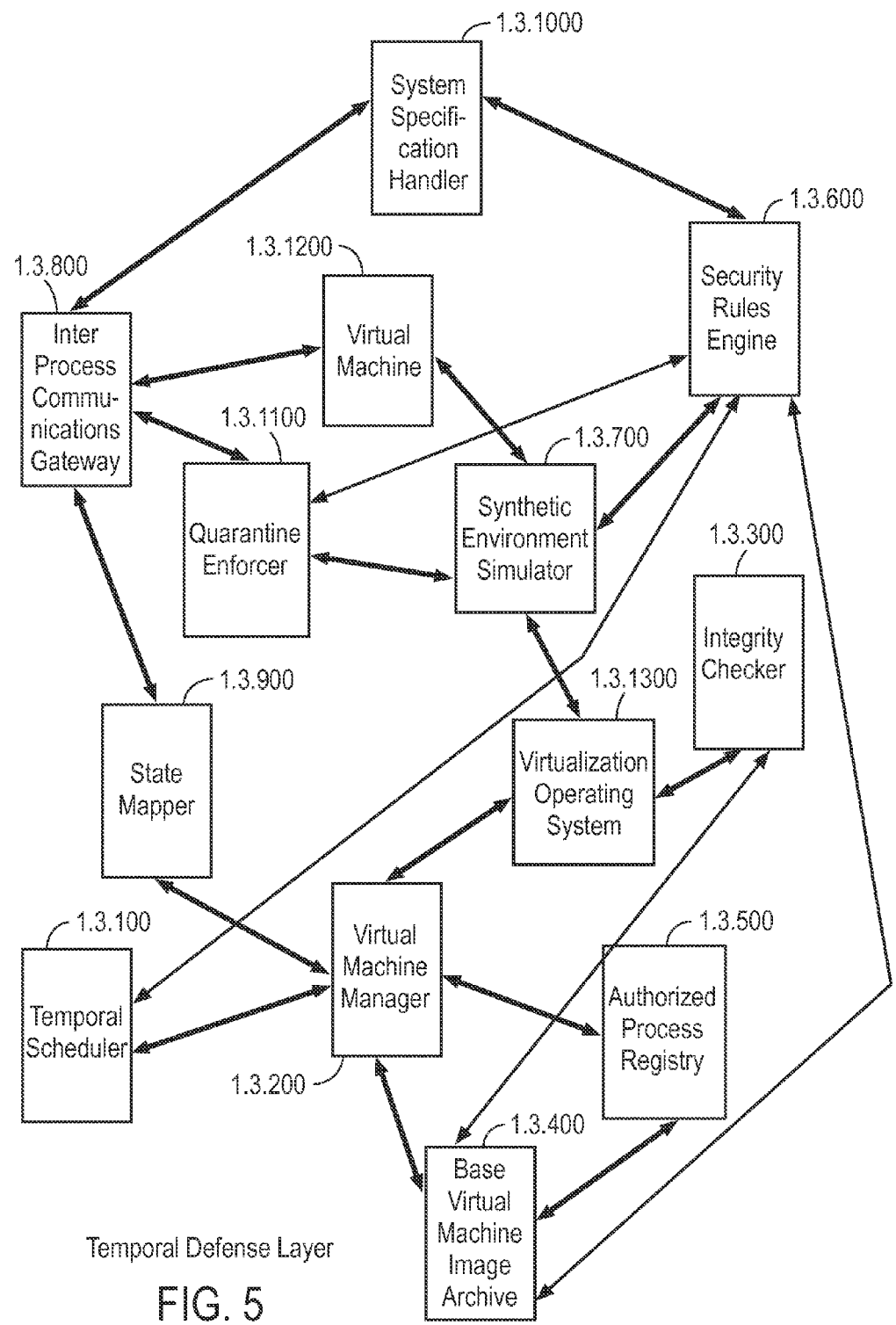
FIG. 5 is a block diagram showing the functional configuration of a temporal defense layer utilized in accordance with an embodiment of the invention.

FIG. 5 shows a block diagram of a configuration of the temporal defense layer for an embodiment of the present invention. The block diagram depicts the functional components of the temporal defense layer and their interactions between themselves, the virtualization operating system shown in FIG. 5, the reference numeral 1.3.1300, such as VMWare vSphere, Xen, KVM or Windows Hyper-V, running on a computing device and the virtual machine's operating system, such as Windows or Linux operating system depicted in FIG. 5, the reference numeral 1.3.1200 being hosted by the virtualization operating system that is induced into a temporal state as managed by the collective components.

In FIG. 5 the reference numeral 1.3.400 depicts the base virtual machine image archive which contains the base images and their instantiation state specifications for each virtual machine, computing entity, which is to become temporal by being managed by the temporal defense layer. As part of each base virtual machine image definition the processes that are authorized to run on a temporal virtual machine depicted in FIG. 5, the reference numeral 1.3.1200 are registered in the Authorized Process Registry 1.3.500, which is associated with a base virtual machine image in archive depicted in FIG. 5 as 1.3.400.

Further describing the system, the Security Rules Engine depicted in FIG. 5, the reference numeral 1.3.600 contains rules of temporal operation on a general computing environment level as well as specific rules pertaining to a specific base virtual machine image stored in the archive depicted in FIG. 5 with reference numeral 1.3.400. The security rules govern how the temporal environment of a virtual machine shown in FIG. 5 with reference numeral 1.3.1200 is managed. Temporal environmental security rules include the interval limits for the random refresh of an instance of a base virtual machine image, how to quarantine an unauthorized process, how to synthesize a production environment, what techniques should be used for system specification masking and what countermeasures should be deployed under what circumstances. Additionally, specific security rules can be set on a base virtual machine image and an authorized process level basis.

Figure 11:
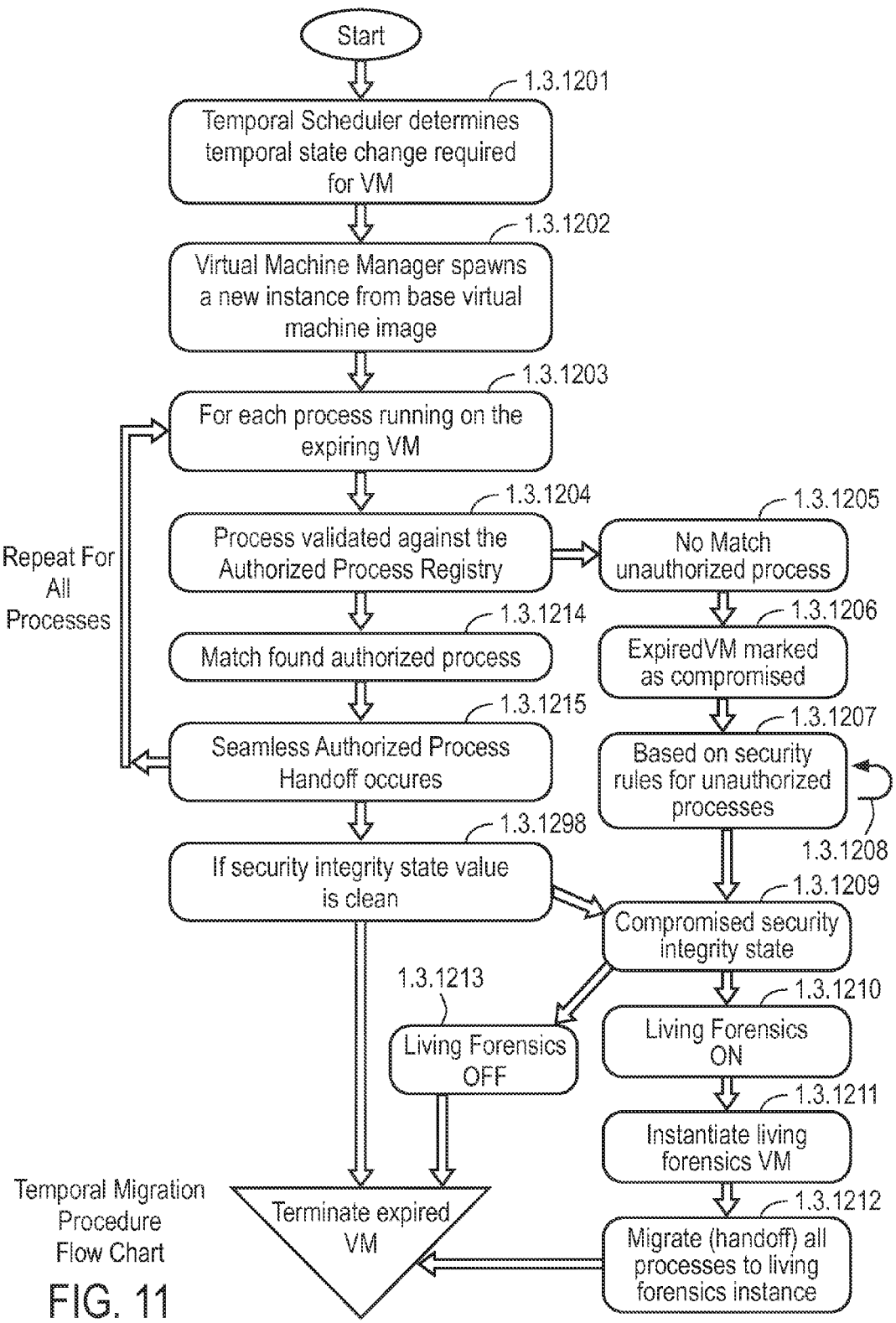
FIG. 11 is a flow chart showing a process for migration of virtual machines in accordance with an embodiment of the invention.

The numeral 1.3.100 depicts the Temporal Scheduler, which handles the scheduling of state changes that comprise the temporal flux of an embodiment of the invention. The temporal scheduler sets a series of random timers whose limits are governed by the security rules engine 1.3.600. When time expires on a timer a corresponding system change or instance refresh is initiated. An example of this is shown in FIG. 11, which steps through the migration process that occurs when a virtual machine is refreshed.

The State Mapper 1.3.900 is the component of the temporal defense layer that maps the state of a process running on a virtual machine 1.3.1200 or the state of the entire virtual machine. The State Mapper interfaces with the Inter Process Communications Gateway 1.3.800 to obtain process state information and interfaces with the Synthetic Environment Simulator 1.3.700 to obtain the complete state information of the virtual machine. From the information collected by the State Mapper 1.3.900 a processing or computing environment snapshot is made that captures the execution state. From a snapshot a process or virtual machine can be set back to the state of execution when the snapshot was taken and processing can resume from that point.

Figure 9:
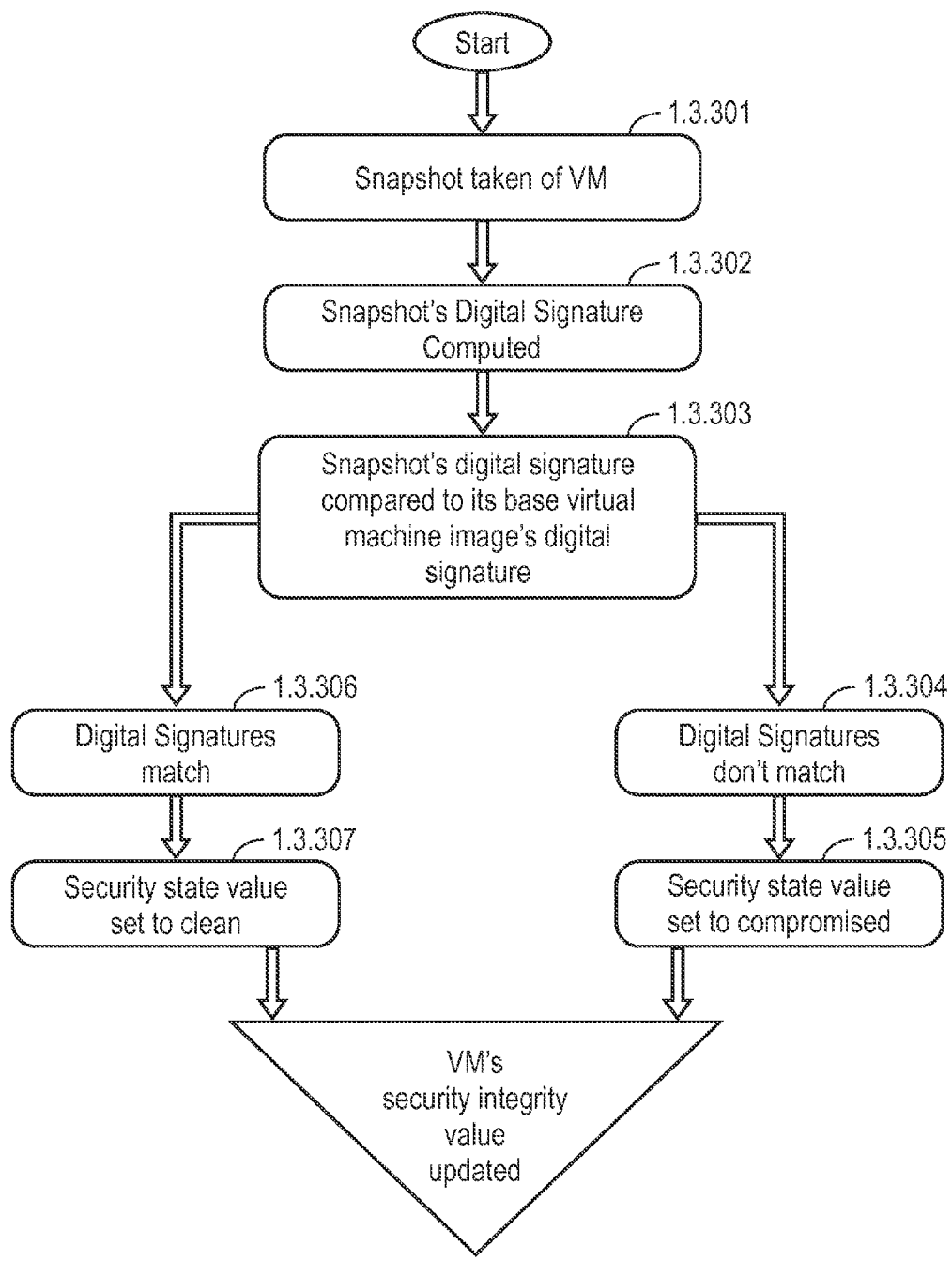
FIG. 9 is a flow chart showing a procedure for integrity checking a virtual machine in accordance with an embodiment of the invention.

The Integrity Checker 1.3.300 is responsible in the temporal defense layer to validate the integrity of an authorized process or a virtual machine 1.3.1200. For the procedure of integrity checking a virtual machine the Integrity Checker 1.3.300 computes a digital signature value of the instance in its current active state. The process for this is depicted in FIG. 9. This value computed is compared against the digital signature integrity value for the base virtual machine image stored in the archive 1.3.400 of FIG. 5. If the values match then the security integrity state of the virtual machine is set to clean which is logged in the Virtual Machine Manager 1.3.200. A similar process occurs when the Integrity Checker 1.3.300 validates an executing process that is running on the virtual machine 1.3.1200. The integrity value for the process, called the authorization identity, is compared against the associated authorization identity value in the Authorized Process Registry 1.3.500. The Temporal Scheduler 1.3.100 initiates an integrity check, which occurs again on a random basis as governed by the security rules in the Security Rules Engine 1.3.600.

The System Specifications Handler 1.3.1000 filters the system specification requests executed by the virtual machine 1.3.1200. When a request is made within the virtual machine's computing environment about a system component, operating system or an available resource specification the request is routed through the System Specifications Handler 1.3.1000 where filtering is done on the request as laid out in the process flow chart in FIG. 8. Upon resolution of the value, it is provided to the virtual machine 1.3.1200 and returned to the inquiring process.

The Synthetic Environment Simulator 1.3.700 is a shim, filter process layer, between the virtual machine 1.3.1200 and the host virtualization operation system 1.3.1300. This is positioned on the outside of the virtual machine instance so that no internal processes being executed by the virtual machine can have any knowledge of its existence. This is important as the function of the Synthetic Environment Simulator 1.3.700 is to emulate the broader computing system the virtual machine 1.3.1200 is part of and the mission critical components of a process so that when activated discovery, access and processing commands are intercepted by the simulator and responses are sent back in affirmative to make all the calling processes believe that they are in a production environment.

The Quarantine Enforcer 1.3.100 is the component of the temporal defense layer that places a virtual machine 1.3.1200 in quarantine and enforces the quarantine across all processes running in the instance. When a virtual machine is in quarantine certain process commands are not carried out as determined by the Security Rules Engine 1.3.600 in conjunction with the Authorized Process Registry 1.3.500 mission critical command specifications. While the quarantine does effect how processes are carried out by the virtual machine when it is part of production the effects are mostly passive as processes even unauthorized processes are allowed to continue to execute. The Quarantine Enforcer marks the infected virtual machine's integrity state in Integrity Checker 1.3.300 as compromised. During the instance refresh as shown in FIG. 11 temporal migration process depending on the security rules the quarantined instance has a snapshot taken of it and saved for future forensics analysis or if the security rules are set to a high masking level then the quarantined instance is moved out of production but is not terminated. In this case another virtual machine is created and set to live forensic quarantine state which is run as a completely synthesized computing environment controlled by the synthetic environment simulator 3.1.700 in such a way as to allow the compromised instance and processes both authorized and unauthorized to continue execution as if no change to their computing environment occurred so that study, would be damage assessment, and experimentation can be conducted. In this live forensics state the Quarantine Enforcer 1.3.1100 lifts quarantine restrictions so that the instance emulates a clean uncompromised state environment. During quarantine it should also be pointed out that the System Specifications Handler 1.3.1000 returns different results as governed by the security rules.

Figure 6:
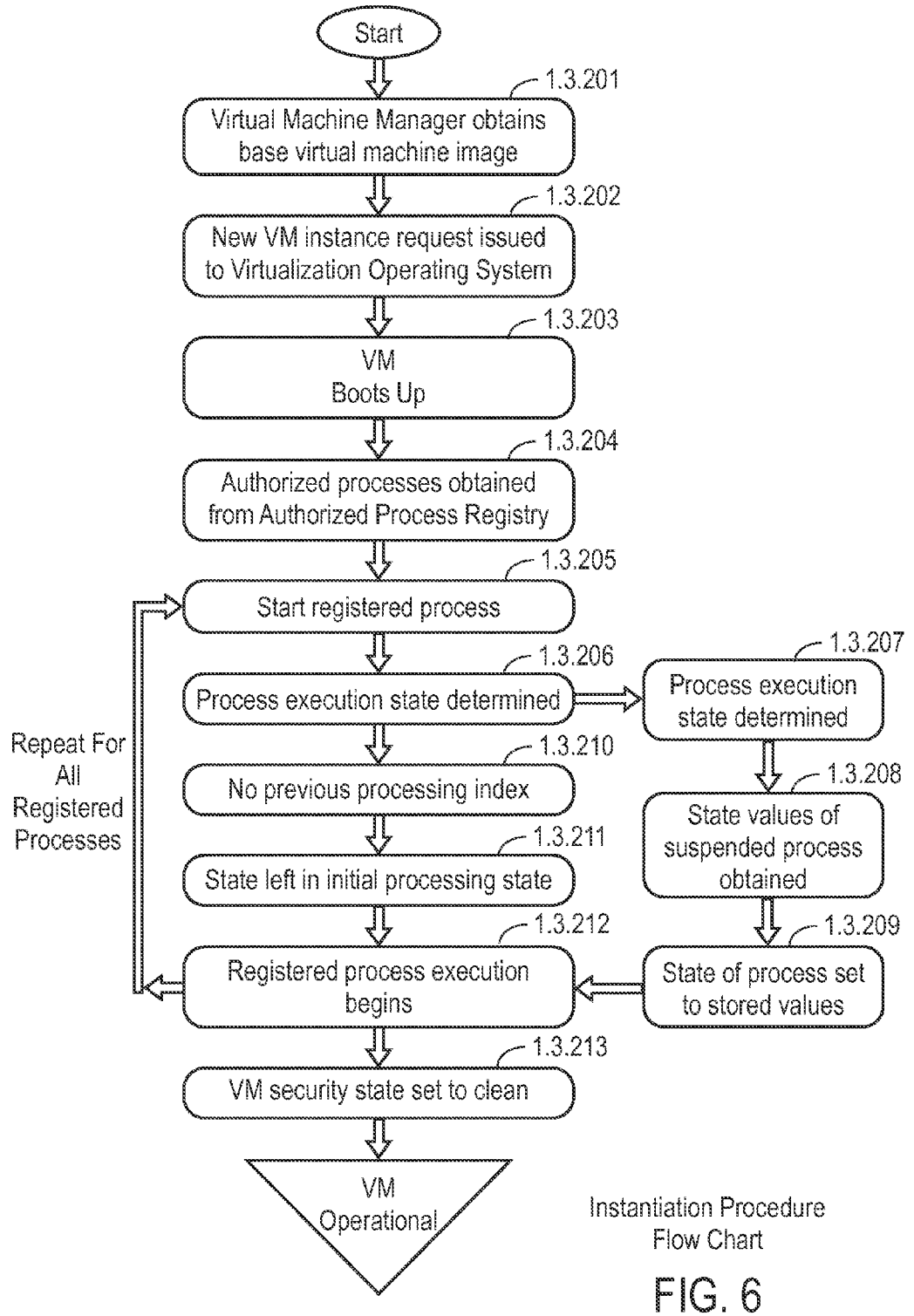
FIG. 6 is a flow chart showing a procedure for instantiating a virtual machine in accordance with an embodiment of the invention.

The process of instantiation of a temporal virtual machine is defined in FIG. 6 beginning with the Virtual Machine Manager 1.3.200 obtaining a base virtual machine image 1.3.201. A new virtual machine instance request is issued to the virtualization operating system 1.3.202. The virtual machine then boots up 1.3.203. The authorized processes are obtained from the authorized process registry 1.3.204. For example, procedures for the base virtual machine image are retrieved by the Virtual Machine Manager 1.3.200 from the Authorized Process Registry 1.3.500.

The registration process is then started 1.3.205. For each authorized process received, the Virtual Machine Manger 1.3.200 of FIG. 5 retrieves the current state of execution for the process's state snapshot stored in the State Mapper 1.3.900; this is performed in accordance with block 1.3.206 of FIG. 6. If there is no previous processing index 1.3.210, the state is left in an initial processing state 1.3.211 and registered process execution begins 1.3.212. In the event of execution state, process execution state is determined 1.3.207. State values of suspended processes are obtained 1.3.208. The state of processes is set to stored values 1.3.209. After all registered processes are processed, the virtual machine security state is set to clean 1.3.213 and the virtual machine is operational.

Figure 7:
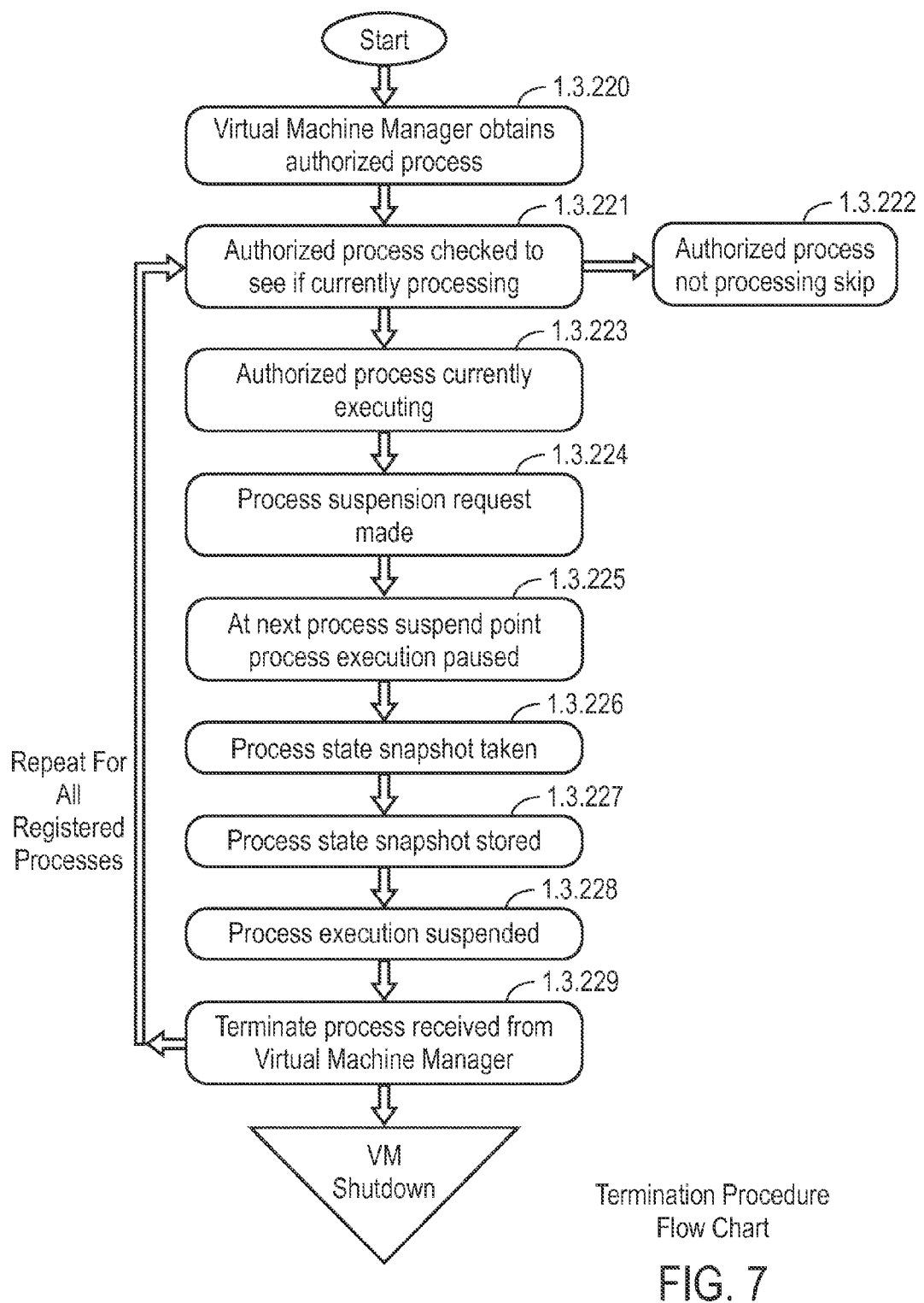
FIG. 7 is a flow chart showing a procedure for terminating a virtual machine in accordance with an embodiment of the invention.

FIG. 7 steps through the termination process of a virtual machine. The termination process begins with a virtual machine termination command issued by the Virtual Machine Manager depicted in FIG. 5 as 1.3.200. The authorized process list is obtained from the Authorized Process Registry 1.3.500; this operation is shown as step 1.3220 in FIG. 7. If the authorized process is not active, it is skipped 1.3.222. If the process is found to be currently processing 1.3.223 the State Mapper 1.3.900 suspends operation of the process 1.3.224, point process execution is paused 1.3.225 and a snapshot of the state of process is taken 1.3.225. The snapshot is processed 1.3.226 and the process state snapshot is stored 1.3.227. Once all the authorized process snapshots are gathered and handled appropriately as determined by the Virtual Machine Manager 1.3.200, the manager issues a shutdown command to the Virtualization Operating System 1.3.1300 for the virtual machine 1.3.1200 slated for termination. The instance is suspended 1.3.228 and is terminated 1.3.229, at which point there is a virtual machine shutdown.

Figure 8:
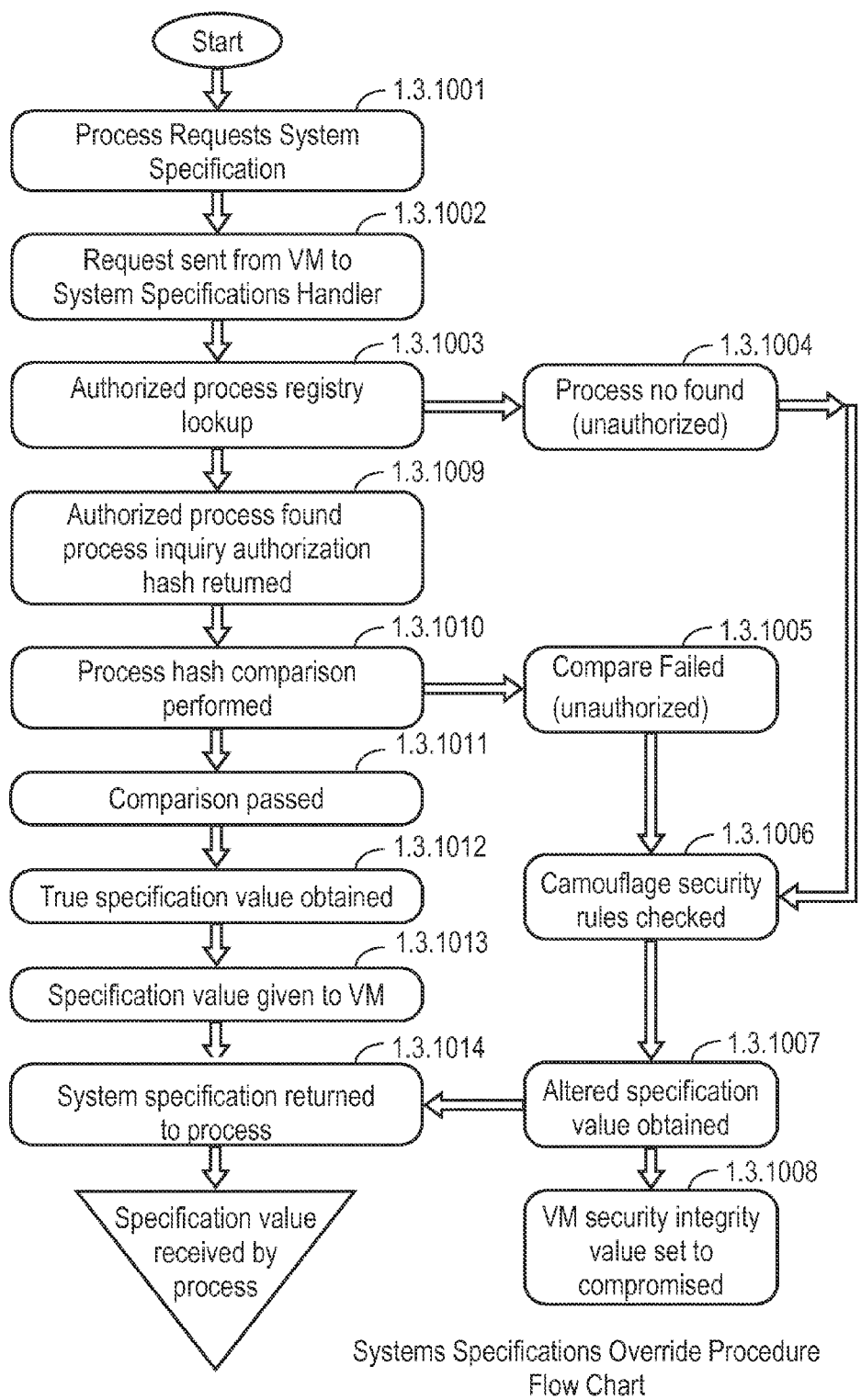
FIG. 8 is a flow chart showing a procedure for system specification override in accordance with an embodiment of the invention.

Another core function of the temporal defense layer in an embodiment of the present invention is the ability to mask, blur or mislead unauthorized processes as to the specification of the computing system or one of its core components of a virtual machine. FIG. 8 is a flow chart showing the override process the System Specification Handler shown in FIG. 5 as numeral 1.3.1000 takes when an unauthorized process inquires about a system specification.

In FIG. 8, the numeral 1.3.1001 begins the override process showing that a process being executed on a virtual machine makes an inquiry request to the instance operating system about the specification of the system or a core component running on the system. The virtual machine 1.3.1200 passes the inquiry request to the System Specification Handler 1.3.1000 via the Inter Process Communications Gateway 1.3.800 as indicated in FIG. 8 with step 1.3.1002.

Continuing the system specifications override process, FIG. 8, the numeral 1.3.1003 depicts the process registry lookup step where the System Specification Handler 1.3.1000 looks the process up to see if it is registered in the Authorized Process Registry 1.3.500. If the process is not found in the registry as depicted in FIG. 8 at block 1.3.1004 then the handler assumes that the process is unauthorized and overrides the system specifications value shown in FIG. 8 at block 1.3.1007, as determined by the security rules indicated by the Security Rules Engine 1.3.600. This processing step is depicted in FIG. 8 at block 1.3.1006. In FIG. 8 the numeral 1.3.1013 depicts the value being returned to the virtual machine 1.3.1200 that is executing the process making the system specifications inquiry and then block 1.3.1014 shows the virtual machine's operating system returning the system specification value finally to the calling process.

Alternatively, if the process that made the system inquiry is found in the Authorized Process Registry 1.3.500 then the related inquiry authorization hash value that was associated with the process is returned 1.3.1009. The authorization hash is a hash computed from the calling process's base execution code providing a unique value, which indicates that the process originated from the authorized base execution code. The hash algorithm used could be any hash algorithm such as SH1 or MD5 and the value can simply be derived by hashing the executable, managed code or script file specifications that instantiates the registered process.

Figure 18:
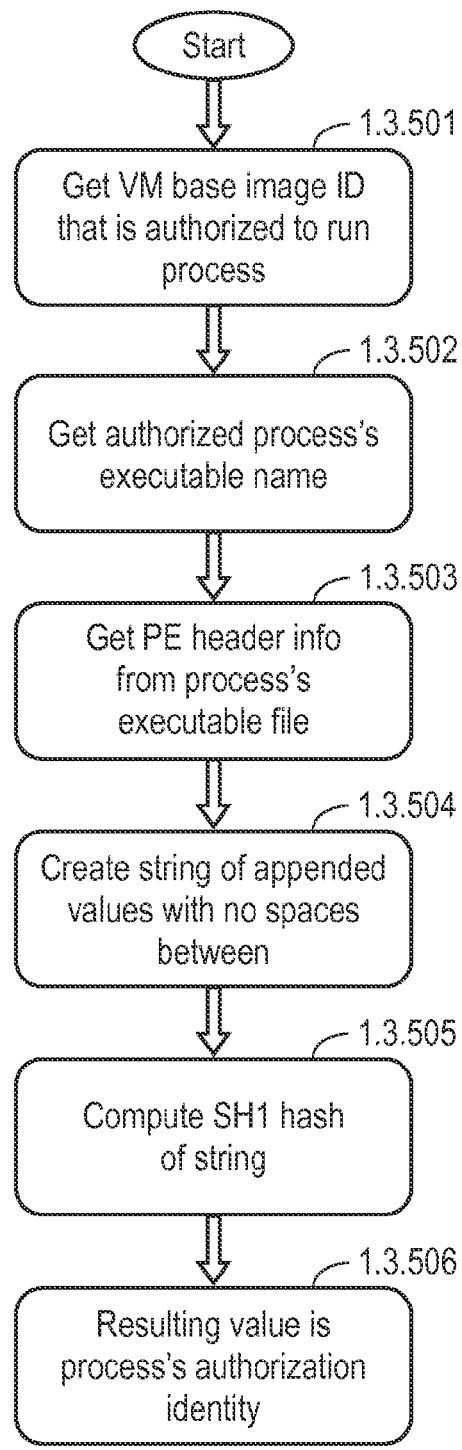
FIG. 18 is a flow chart showing a procedure for deriving an identifying hash value of an authorized process called the inquiry authorization hash.

FIG. 18 shows an example of deriving an inquiry authorization hash for a registered Windows based application whose code file is a standard .exe for an embodiment of the present invention. The first step as depicted in FIG. 18 is to obtain the base virtual machine image ID 1.3.501 as stored in the Base Virtual Machine Image Archive 1.3.400 having the data scheme as depicted in FIG. 16, which is associated with the authorized process whose inquiry authorization is being derived. This is the virtual machine that the authorized process is authorized to run on. Step two in the inquiry authorization process as depicted in FIG. 18, is to obtain the name of the process 1.3.502 or in this case the application executable file name. Next, the process or executable's specifications for the program executable file header are secured 1.3.503. The specification used for this example is the machine specification, the number of sections, the date timestamp of the file, the number of symbols, the size of the optional header and the number of characteristics. These COFF header values could alternatively be retrieved from the running process. Block 1.3.504 depicts the fourth step of creating a concatenated string of all these values in the above defined order (VM ID, application filename, machine specification, number of sections, the date timestamp of the file, the number of symbols, optional header size, and the number of characteristics). The fifth derivation step 1.3.505 computes the SH1 hash of the concatenated string. The resulting hash value is the inquiry authorization hash shown in FIG. 18 at block 1.3.506, which is stored in the authorized process's entry in the Authorized Process Registry as shown in the data configuration depicted in FIG. 17.

Returning to FIG. 8, the numeral 1.3.1011 depicts the comparison process step in which the inquiry authorization hash value of the calling process, the process requesting the system specification, and the inquiry authorization hash value retrieved from the registry as indicated above are compared for equality. If the inquiry authorization hash values do not match then the assumption is made that the calling process that is requesting the system specification is an unauthorized 1.3.1005. The system specifications override procedure as explained above is engaged by the process starting at the processing step 1.3.1006 resulting in returning the override value to the calling process 1.3.1014.

Alternately, if the calling process's inquiry authorization hash and the inquiry authorization hash returned by registry values are equal as determined by block 1.3.1011 then the process is considered to be authorized then the true system specification value is obtained 1.3.1012. The true system specification value is returned to the virtual machine that is executing the process that made the system specifications inquiry 1.3.1013, which it then returns the true system specifications value to the calling process 1.3.1014.

If a process is found to be unauthorized then the entire virtual machine 1.3.1200 of FIG. 5 is marked as compromised as represented in FIG. 8 with block 1.3.1008. The security state of the instance is set to a value indicating security compromised in the Virtual Machine Manager 1.3.200. This occurs just after the virtual machine that is executing the process, which made the system specifications request, receives the overridden specifications value shown in FIG. 8 at block 1.3.1013.

Figure 19:
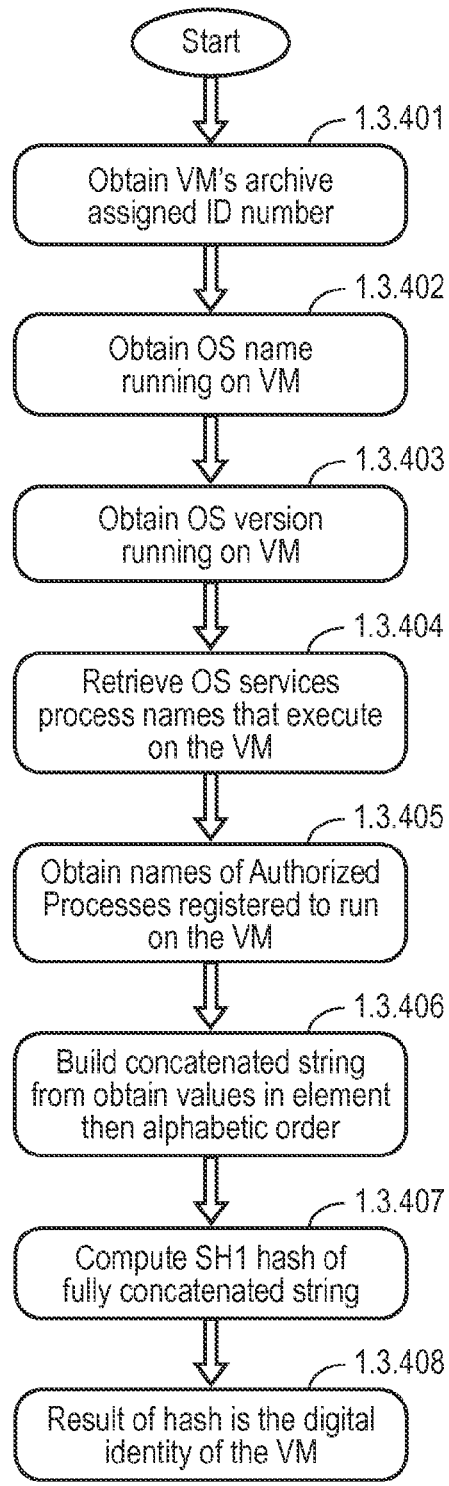
FIG. 19 is a flow chart showing a procedure for deriving a digital identity of a virtual machine.

FIG. 9 shows the integrity validation process that a virtual machine 1.3.1200 uses to determine if the instance is clean or compromised. In this embodiment, a digital signature representing a clean, uncompromised integrity state of a virtual machine 1.3.1200 is pre-computed from the base virtual machine image stored in the Base Virtual Machine Image Archive 1.3.400 and is stored in association with the corresponding base virtual machine image in a data configuration, as indicated in FIG. 16. This digital signature can be any number of computed values derived from the virtual machine image. In this example, as described in FIG. 19, the digital signature of a virtual machine is derived from the base virtual machine ID as depicted in FIG. 19 as block 1.3.401 combined with the name of the operating system as depicted in FIG. 19 with block 1.3.402 and its extended version being run by the virtual machine as depicted in FIG. 19 at block 1.3.403. This information along with the operating system's, running on the virtual machine, core processes' names concatenated in alphabetical order depicted in FIG. 19, the numeral 1.3.404 along with the authorized process names associated with this virtual machine as stored in the Authorized Process Registry (1.3.500 in FIG. 5) in alphabetical concatenation order as depicted in FIG. 19 block 1.3.405. The resulting concatenation string is represented at block 1.3.406, which is then run through the SH1 hash at block 1.3.407, with an output value at block 1.3.408, which is the virtual machine's digital identity in this embodiment.

When an integrity check occurs by the Integrity Checker 1.3.300, a snapshot is taken of the virtual machine, as shown with block 1.3.301 of FIG. 9. The snapshot's digital signature is then computed, as shown with block 1.3.302. For example, the digital signature of the virtual machine 1.3.1200 that is being integrity checked may be computed using the hash value derived by performing the digital identity derivation process as described in FIG. 19. The Integrity Checker 1.3.300 then retrieves the associated pre-computed digital signature computed as described above from the Base Virtual Machine Image Archive stored in the data configuration in FIG. 16. Block 1.3.303 of FIG. 9 depicts the comparison process that the Integrity Checker performs on the digital signature obtained from the archive and the digital signature derived from the snapshot of the virtual machine 1.3.1200 that the integrity check is being performed on. If the digital signatures matches as depicted in FIG. 9 at block 1.3.306 then the integrity of the virtual machine is validated and marked as clean in the Virtual Machine Manager 1.3.200 as depicted in FIG. 9 at block 1.3.307.

Alternately, if the digital signatures do not match as depicted in FIG. 9 at block 1.3.304, then the virtual machine being checked is assumed to be compromised as the integrity check failed to match. This means an unauthorized process was running on the instance being checked. As a result the security state setting for the virtual machine is set to compromised in the Virtual Machine Manager 1.3.200 indicating that the instance is compromised, as depicted in FIG. 9 at block 1.3.305.

Figure 10:
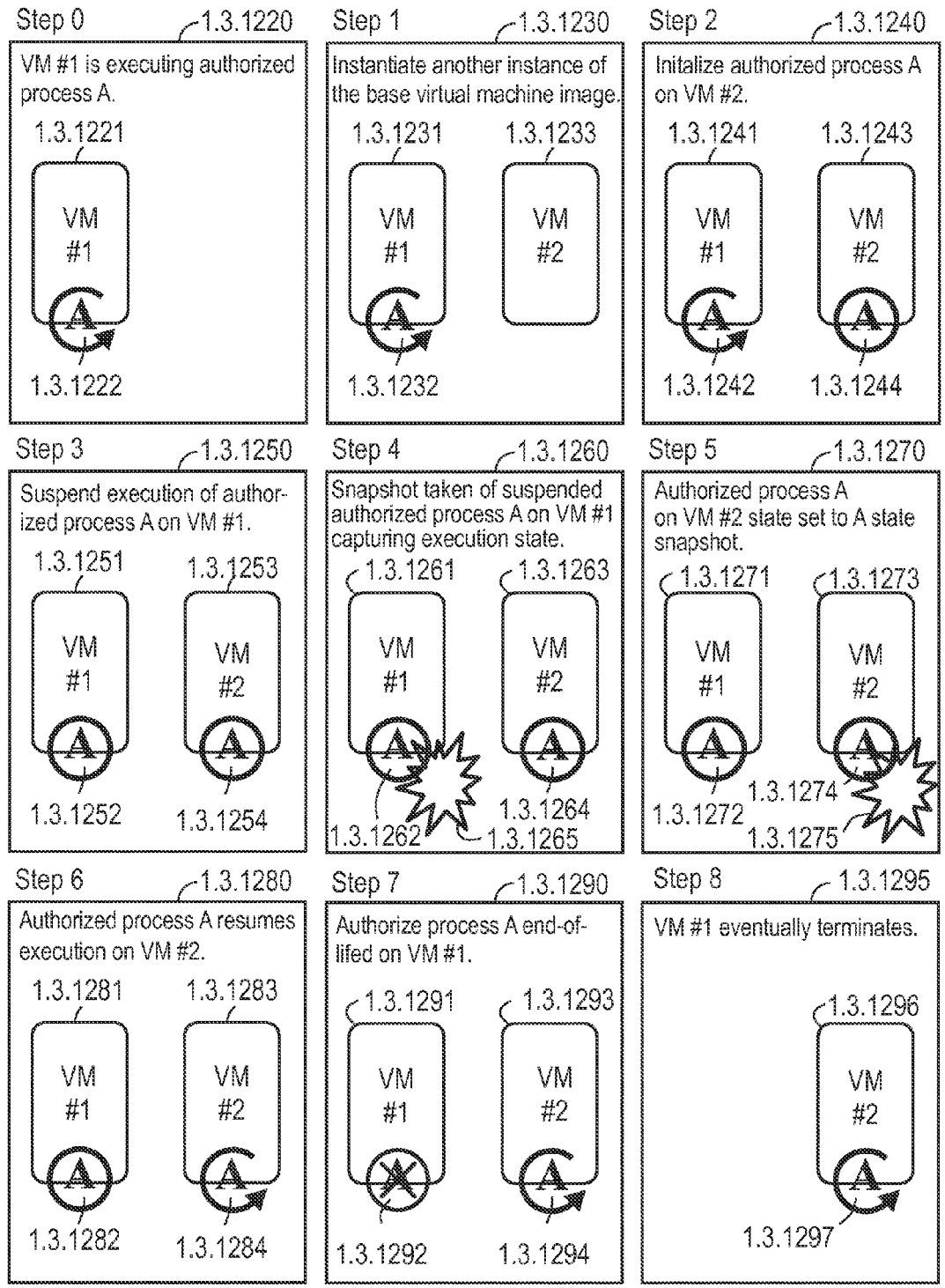
FIG. 10 is a diagram sequence showing a seamless process handoff between virtual machines in accordance with an embodiment of the invention.

FIG. 10 shows a diagram series of how the seamless authorized process handoff occurs between two machines. An authorized process is a process that has been registered, has a registry entry record, and is in the Authorized Process Registry 1.3.500. The registered processes are associated with a base virtual machine image stored in the Base Virtual Machine Image Archive 1.3.400. A registered process is authorized to run, execute or process on a base virtual machine image instance 1.3.1200 if it is associated with indicia in the registry.

The seamless authorized process handoff procedure is depicted in FIG. 11, block 1.3.1215 is shown as part of the temporal migration process and is shown in detail in FIG. 10 step-by-step. The seamless authorized process handoff occurs when there is a desire to move an authorized process that is currently being executed on one virtual machine 1.3.1200 which was instantiated and described in the Instantiation Process in FIG. 6, from a base virtual machine image stored in the Base Virtual Machine Image Archive 1.3.400 to another virtual machine instance derived from the same base virtual machine image without hindering the authorized processes execution.

In FIG. 10, the numeral 1.3.1220 shows step 0 of the seamless authorized process handoff depicting the state of the process before the process handoff begins. Numeral 1.3.1221 shows the virtual machine that is executing the authorized process (A) 1.3.1222 which is the process that has to be moved or handed off to another virtual machine that was derived from the same base virtual machine image and instantiated as described above. In step 1 of FIG. 10, the numeral 1.3.1230 indicates the destination virtual machine depicted 1.3.1233 is located or instantiated which will be the instance that the authorized process, process (A) 1.3.1232 is to be moved to for continued execution. In step 1, process (A) is currently still being executed on originating instance 1.3.1231 referred to as the original or current virtual machine.

Numeral 1.3.1240 shows the destination virtual machine 1.3.1243 starting up or initializing the authorized process (A) 1.3.1244 referred to as the new authorized process (A). This is occurring while the original virtual machine 1.3.1241 continues executing process (A) 1.3.1242 referred to as the production authorized process (A).

Numeral 1.3.1250 shows the production authorized process (A) 1.3.1252 execution being paused by the original virtual machine 1.3.1251 that is hosting the execution of the authorized process which has now been suspended. The numeral 1.3.1254 depicts the new authorized process (A) initialized on the destination virtual machine as 1.3.1253, the execution of this process is also suspended.

Step 4 of the seamless authorized process handoff is shown in FIG. 10 with numeral 1.3.1260 depicting the snapshot procedure. Once production authorized process (A) as described above in step 3 is suspended the State Mapper 1.3.900 of FIG. 5 takes a state snapshot depicted in FIG. 10. The numeral 1.3.1265 of FIG. 10 of the newly suspended production authorized process (A) 1.3.1262 captures the current execution point or process instruction index pointer of the last instruction that was executed by the original virtual machine depicted in FIG. 10 with numeral 1.3.1261 on behalf of the production authorized process (A) depicted in FIG. 10 with the numeral 1.3.1262, which is recorded in the process's state snapshot along with the memory state, the process stack state as part of the State Mapper depicted in FIG. 5. Numeral 1.3.1265 represents when all the information is collected. The numeral 1.3.1264 depicts the new authorized process (A) initialized on the destination virtual machine 1.3.1263; the execution of the process is also suspended.

Numeral 1.3.1270 shows the process state being duplicated on the new process. The state snapshot 1.3.1275 taken of the suspended production authorized process (A) 1.3.1272 is used to set the suspended new authorized process (A) 1.3.1274 to a matching process execution state. Both the original virtual machine 1.3.1271 and the destination virtual machine 1.3.1273 have their respective authorized process (A)'s execution suspended. The State Mapper 1.3.900 used the captured state snapshot information to modify the memory and stack and execution states of the new authorized process (A)'s shown in FIG. 10 with the numeral 1.3.1274 state to match that of the suspended authorized process (A)'s state at its last point of execution before it was suspended effectively replicating the production authorized process (A) on the destination virtual machine 1.3.1273.

Step 6 of the seamless authorized process handoff is shown in FIG. 10 with the numeral 1.3.1280 depicting the execution of the production authorized process (A) resuming from the next processing instruction from the point where it was suspended. While execution of the production authorized process (A) 1.3.1282 on the original virtual machine 1.3.1281 remains suspended, the newly replicated authorized process (A) 1.3.1284 being processed by the destination virtual machine 1.3.1283 is set to resume execution of the process at the next processing instruction from the point where the original production authorized process was suspended before the snapshot whose information was used for replication was taken. The last execution point was recorded by the State Mapper 1.3.900 allowing the processing stack to be set properly in the destination virtual machine 1.3.1283 for the replicated production authorized process 1.3.1284 to begin processing on the next instruction allowing the authorized process to be successfully moved from one virtual machine instance to another without interruption to the execution order of the authorized process making a seamless process transition.

Step 7 of the seamless authorized process handoff is shown in FIG. 10. The numeral 1.3.1290 depicts the housekeeping step of terminating the old authorized process. Numeral 1.3.1291 depicts the original virtual machine which currently has the execution of the original production authorized process (A) 1.3.1292 suspended. The suspended process (A) is terminated which does not affect the executing production authorized process (A) 1.3.1294 on the destination virtual machine 1.3.1293.

Step 8 of the seamless authorized process is associated with numeral 1.3.1295, which represents the successful end state of the seamless handoff process once the original virtual machine has been terminated. The production authorized process (A) 1.3.1297 is being actively executed by the destination virtual machine 1.3.1296.

FIG. 11 shows the Temporal Migration process flow chart, which details induction of a temporal state for instances of the underlying base virtual machine image and how the execution of processes is handled. The migration process begins when the instance life timer expires for the virtual machine 1.3.1200 as randomly set by the Temporal Scheduler 1.3.100. When the timer expires the Temporal Scheduler 1.3.100 begins the temporal migration process of the virtual machine whose timer just expired as indicated in FIG. 11 with block 1.3.1201. The Temporal Scheduler signals the Virtual Machine Manager 1.3.200 to instantiate a new instance of the base virtual machine image that is associated with the virtual machine whose instance life timer just expired, as depicted in FIG. 11 with block 1.3.1202. This new virtual machine instantiation occurs as depicted in the process flow chart in FIG. 6 and follows the process steps for setting the related authorized process states to initialize as indicated by the process path that includes numeral 1.3.210 in FIG. 6. Once the last instantiation step is completed (FIG. 6, block 1.3.212), the Virtual Machine Manager has a clean security integrity state set for the newly instantiated destination virtual machine and the authorized processes are all initialized and suspended.

Block 1.3.1203 of FIG. 11 depicts the beginning of a repetitive process that is carried out by the Virtual Machine Manager for each process running on the virtual machine whose instance life timer just expired. Block 1.3.1204 depicts the authorized process verification step where the process is suspended by the State Mapper (1.3.900 in FIG. 5) and a snapshot of the process's state is taken as stated above in the seamless authorized handoff description. Then the process is checked against the Authorized Process Registry (1.3.500 in FIG. 5) to determine if it is an authorized process. If it is an authorized process then the process path goes to block 1.3.1214 that then proceeds to block 1.3.1215 which is the processing step that depicts the Seamless Authorized Process Handoff (shown in FIG. 10). This moves an authorized process being executed from one virtual machine to another that has been instantiated from the same base virtual machine image. After the handoff of block 1.3.1215 is completed, the authorized process is now being executed by the new destination virtual machine that was created in block 1.2.1202. This process path is repeated for all processes found to be authorized that were suspended on the virtual machine whose instance life timer just expired.

Alternately, if a process fails the authorization step of block 1.3.1204 the execution path proceeds to block 1.3.1205, which indicates that an unauthorized process was found being executed on the virtual machine whose instance life timer just expired. Block 1.3.1206 depicts the Virtual Machine Manager marking the security integrity state of the virtual machine whose instance life timer just expired to a value indicating it is compromised. Block 1.3.1207 depicts the temporal migration processing step where the Security Rules Engine (1.3.600 in FIG. 5) is queried to determine what countermeasure steps are to be taken for the unauthorized process that was just discovered. If the rule is set to terminate all unauthorized process upon temporal migration then path 1.3.1208 is taken, skipping the handoff of the unauthorized process, which is now slated for termination when the virtual machine is terminated. Block 1.3.1209 depicts the step of checking if the security rule returned by the inquiry indicates that the unauthorized process is to be put in a living forensics state in which the unauthorized process is to continue being executed. Block 1.3.1210 depicts the Virtual Machine Manager (1.3.200 in FIG. 5) setting a flag that indicates that living forensics is running for the virtual machine whose instance life timer has just expired.

Continuing the unauthorized process execution path of the temporal migration process, if the living forensics option is on, then a third virtual machine is instantiated by the Virtual Machine Manager (1.3.200 in FIG. 5), which is set to living forensics mode, which brings up the new instance in a way that synthesizes the computing environment as depicted with block 1.3.1211 of FIG. 11.

The rest of the processes are checked and moved if authorized to the new destination virtual machine that was newly created in block 1.3.1202. Upon completion of seamlessly handing off all authorized processes to the newly instantiated destination virtual machine, the Virtual Machine Manager (1.3.200 of FIG. 5) sets the security integrity state of the new destination virtual machine that was created in block 1.3.1202 to a value indicating a clean security integrity value as the destination instance does not have any unauthorized processes as they were not handed off to the destination instance. Additionally, the Virtual Machine Manager resets the instance duration timer to a random value in the Temporal Scheduler continuing the temporal cycle. The authorized processes are all being executed in the production environment on the new destination virtual machine created in block 1.3.1202.

If the virtual machine whose instance duration timer expired has a living forensics flag set to ON and a security state reflected in the Virtual Machine Manger (1.3.200 in FIG. 5) is set to compromised then the migration processing step of block 1.3.1212 is performed, which migrates all the processes both authorized and unauthorized that are suspended in the virtual machine whose instance duration timer recently expired to the third virtual machine created at block 1.3.1211, which is running a synthetic computing environment in living forensics mode. The authorized processes are migrated using the seamless authorized handoff process shown in FIG. 10. The unauthorized processes are replicated by the State Mapper that takes an exact state map of the process code, the memory state and the stack state and copies it to the synthesized virtual machine that is in living forensics mode as created at block 1.3.1211. Once all the processes are moved, the process suspension is lifted and the virtual machine running the synthetic environment continues execution of the processes which are now not part of the production environment but rather in a synthesized computing environment that can be studied, analyzed and manipulated.

Block 1.3.1298 shows the last processing step of the temporal migration process where the now old virtual machine whose instance duration timer expired to start the temporal migration process is now terminated in accordance to the process defined in FIG. 7. The result is a clean virtual machine created at block 1.3.1202 executing the authorized processes that were migrated to the clean instance via this temporal migration process, effectively moving the production processing. If the old virtual machine was compromised, then a synthesized computing environment was instantiated from the base virtual machine image and set to the processing state of the old virtual machine inclusive of the unauthorized processes. This allows the unauthorized process to continue executing in a manner that is not detectable to the unauthorized process or the handler of the unauthorized process.

Figure 12:
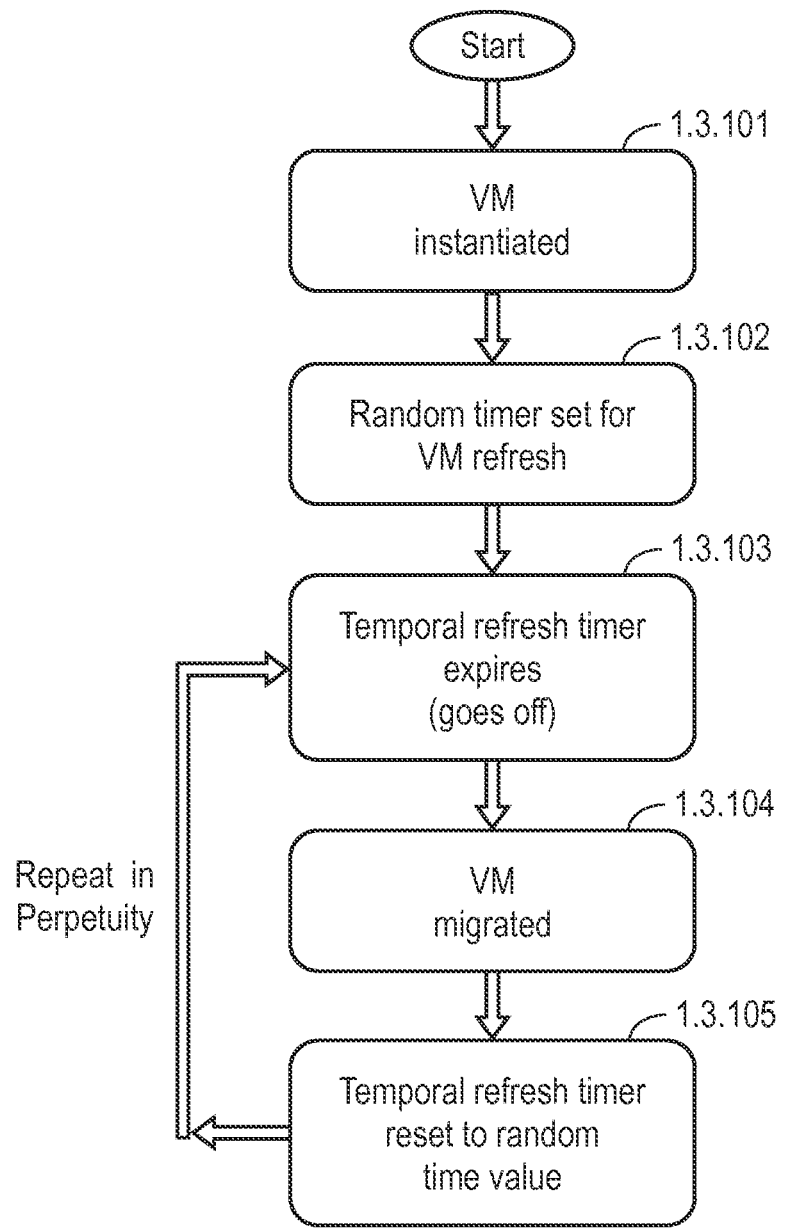
FIG. 12 is a flow chart showing a procedure for how temporal state is managed in accordance with an embodiment of the invention.

FIG. 12 is a flow chart of the temporal scheduler process which controls the refreshing of virtual machines (1.3.1200 in FIG. 5) that have been instantiated by and registered with the Virtual Machine Manager (1.3.200 in FIG. 5) as derived by a source base virtual machine image residing in the Base Virtual Machine Image Archive (1.3.400 in FIG. 5). Block 1.3.101 of FIG. 12 illustrates the instantiation step that is detailed in FIG. 6. Block 1.3.102 of FIG. 12 depicts setting the instance life timer for the first time which begins the temporal cycle for the virtual machine, which can now be referred to as temporal virtual machine as it now undergoes frequent instance refreshes as determined by the Temporal Scheduler (1.3.100 of FIG. 5) and is carried out by the Virtual Machine Manager (1.3.200 of FIG. 5). The time value used to set the duration of the instance life timer in this embodiment of the invention used a random or pseudo-random number generator to compute a random interval for the duration of the instance life timer. This is done to add a higher level of security, which is gained through randomizing the refresh interval to prevent timing attacks by making it harder to determine a refresh is occurring. To govern the limits of the refresh rate minimum and maximum duration values are set in the Security Rules Engine (1.3.600 in FIG. 5) which governs the system performance impact that the temporal computing environment has on the underlying computing device or network apparatus.

Block 1.3.103 of FIG. 12 depicts the instance life timer for a given virtual machine expiring. Upon expiration, the refresh process is triggered by the Temporal Scheduler (1.3.100 in FIG. 5) notifying the Virtual Machine Manger (1.3.200 in FIG. 5) to do a refresh of the virtual machine (1.3.1200 in FIG. 5) whose instance life timer just expired. Block 1.3.104 of FIG. 12 depicts this instance refresh process, which carries out the temporal migration process as shown in detail in the FIG. 11 flow chart. Once the migration process is completed a new or refreshed virtual machine is put in to operation processing the registered processes associated with the base virtual operating system image. The Virtual Machine Manager notifies the Temporal Scheduler that the new instance is operational. Block 1.3.105 of FIG. 12 depicts the Temporal Scheduler resetting the timer for the newly instantiated virtual machine, which is now operational, completing the temporal state refresh process. A random number is again retrieved within the security rules limits and the instance life timer's duration is set to this value.

Figure 13:
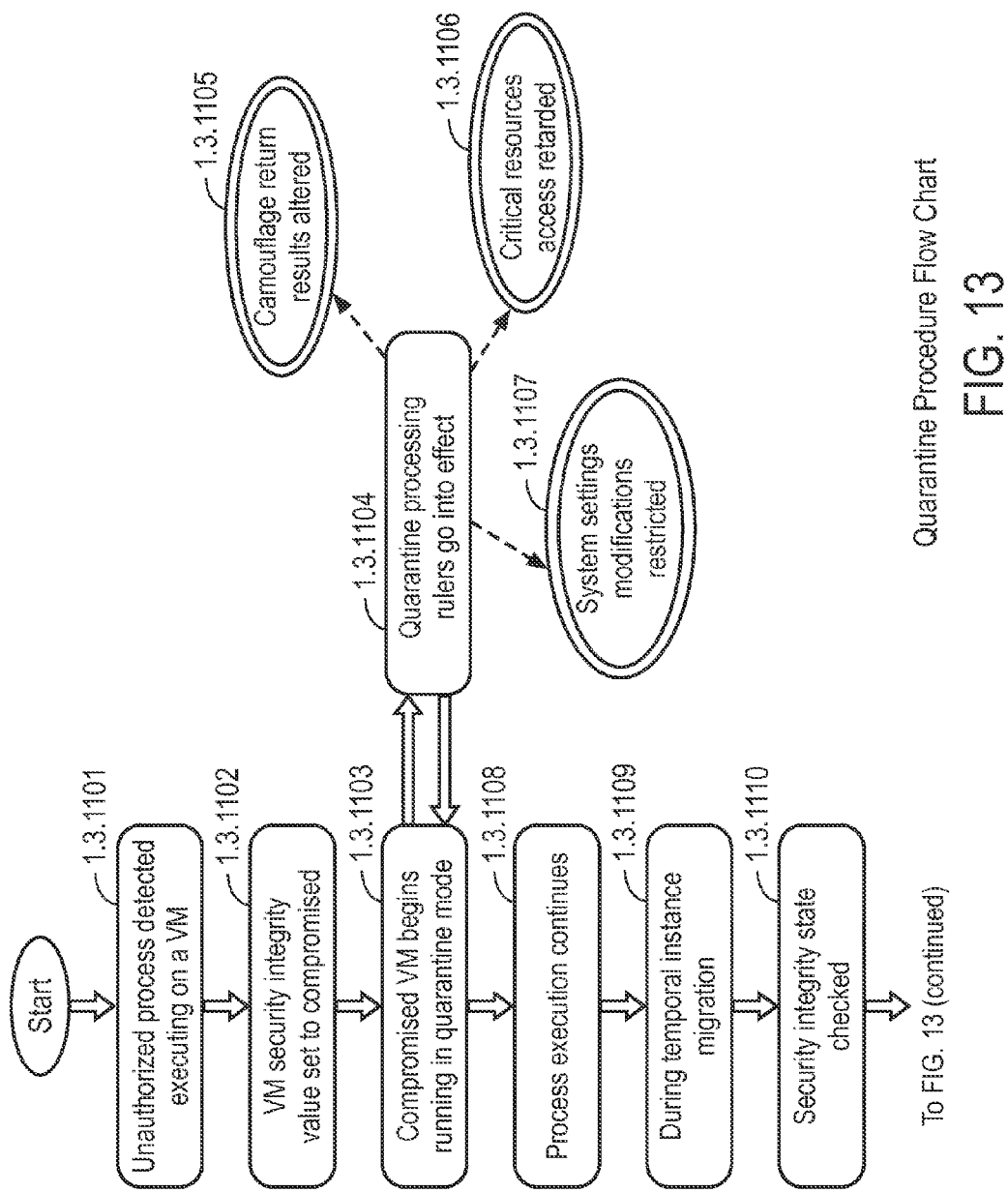
FIG. 13 is a flow chart showing the quarantine procedure associated with an embodiment of the invention.
Figure 13:
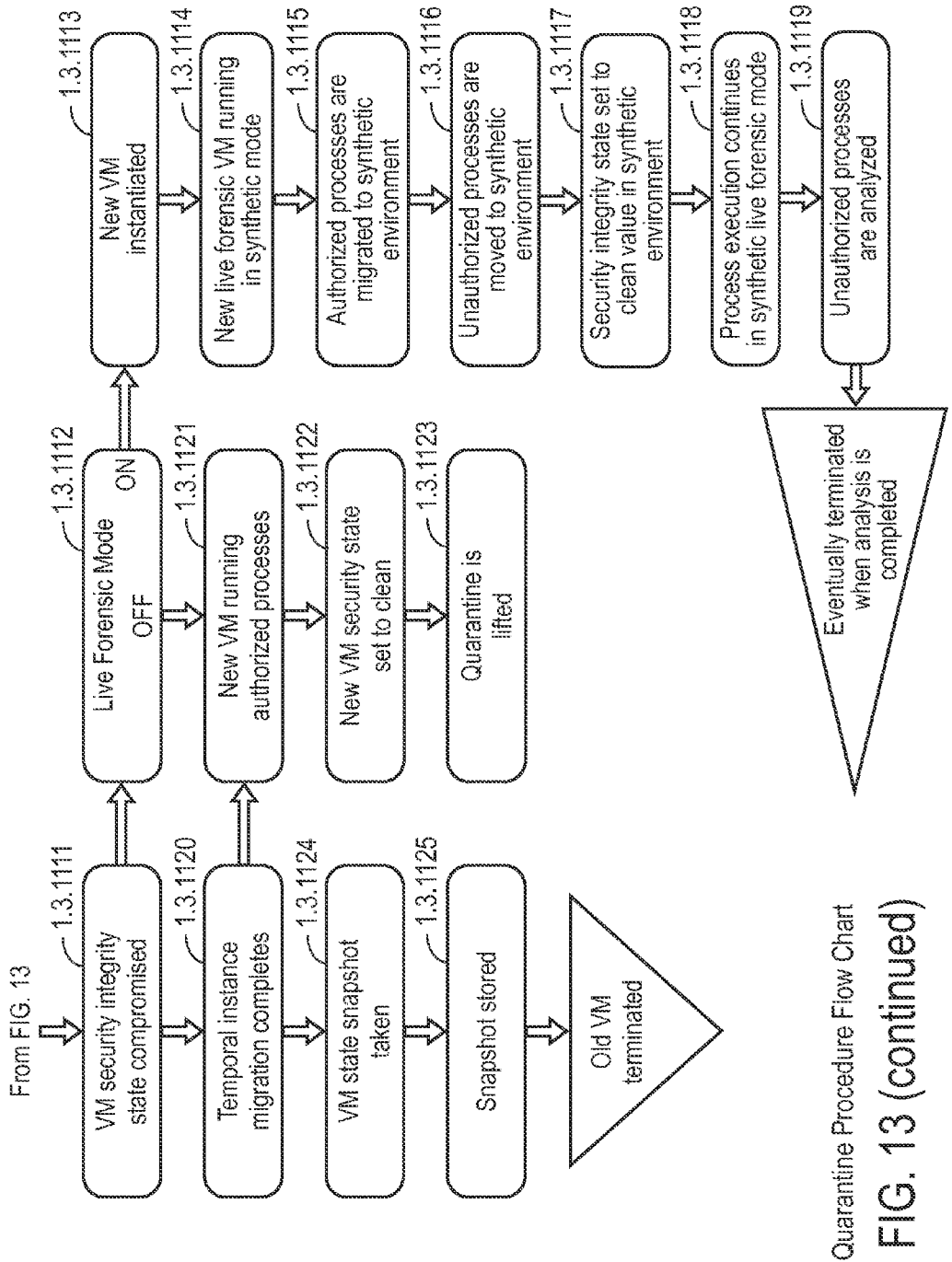

FIG. 13 shows the quarantine procedure flow chart for this embodiment of the invention. The quarantine functionality is designed to achieve three main security goals in a temporal system: containing an unauthorized process, reducing the damage an unauthorized process can do to the temporal computing system and doing so in a manner that doesn't alert the unauthorized process or its handler that it has been detected and quarantined.

Block 1.3.1101 is the first step in the quarantine process, which is the detection of an unauthorized process. Detection can happen in a number of ways, two of which are discussed in other definitional areas such as in the temporal migration process shown in block 1.3.1205 of FIG. 11 and in the Integrity Checking process shown in block 1.3.304 of FIG. 9.

Block 1.3.1102 of FIG. 13 depicts the setting of the security state for the virtual machine (1.3.1200 in FIG. 5) in the Virtual Machine Manager to a value indicating the instance's integrity is compromised if it is not already set as such. Once the instance's security integrity value has been set to compromised, the instance begins to run as a quarantined virtual machine as depicted in block 1.3.1103 and the instance can be referred to as running in quarantine mode. Once a virtual machine has been put in quarantine, the quarantine security process rules go into effect as depicted with block 1.3.1104, as determined by the Security Rules Engine (1.3.600 of FIG. 5). These quarantine security rules alter the values returned by the system specification camouflaging process, detailed in FIG. 8, and depicted in FIG. 13 with block 1.3.1105.

An example in this embodiment would be that when an inquiry is made to determine what operating system version is executing, instead of returning the real version number now that quarantine mode is active it returns an older version ID of the operating system so that the unauthorized process has a harder time exploiting the system, such as an unauthorized privilege escalation. The quarantine security rules also limit the access to critical resources of the system, as shown at block 1.3.1106. An example of this is when quarantine mode is not on and all processes have access to the shared network file and print resources. Once the quarantine mode is on, the quarantine security rules restrict access to all shared file and print resources which can have the effect of isolating an unauthorized process, which for example could be a worm from infecting the printers as it can no longer exploit the shared printing resources. In addition, the quarantine security rules prevent modifications to system settings, as shown with block 1.3.1107. An example of this is to restrict writing privileges to the system registry of a virtual machine running the Windows operating system for all processes as specified by a quarantine security rule even if the process has system privileges to do so.

Block 1.3.1108 depicts the processes including the unauthorized processes on a virtual machine that is operating in quarantine mode, which continues executing all processes within the limits of permissibility set by the quarantine security rules. This is again done to mitigate system processing impact and to not raise awareness of the unauthorized processes that they have been detected and are now being contained. During the next temporal refresh as controlled by the Temporal Scheduler (1.3.100 in FIG. 5) during the Temporal Migration Process detailed in FIG. 11 an integrity check is performed as highlighted with block 1.3.1110 in FIG. 13. In FIG. 11, block 1.3.1209 is the security integrity state of the virtual machine being migrated, which is shown in FIG. 13 with block 1.3.1111, which indicates that the virtual machine is operating in quarantine mode, as shown with block 1.3.1112, which shows a check being made to determine if live forensics mode is on for the instance. If live forensics mode is on, block 1.3.1113 is invoked, the operations of which are detailed in FIG. 11, block 1.3.1210. A new virtual machine is created, again detailed in FIG. 11, block 1.3.1211, which is placed in synthesized mode shown in FIG. 13 at block 1.3.1114. This mode may be controlled by the Synthesized Environment Simulator (1 1.3.700 in FIG. 5). This new synthesized virtual machine becomes a non-production live forensics instance of the compromised virtual machine that is being migrated.

In FIG. 13, block 1.3.1115 highlights the migration of authorized processes from the compromised instance to the live forensics synthesized environment instance utilizing the seamless authorized handoff process detailed in FIG. 10. Block 1.3.1116 highlights the unauthorized processes being handed off from the infected instance to the live forensics synthesized environment instance being copied from the compromised system and replicated via an unauthorized state snapshot, which includes duplicating the unauthorized process's execution instructions (native, managed or script code), memory being used and the execution stack to the live forensics synthesized environment instance. Once the live forensics synthesized environment instance has all the process migrated to it, the live forensics synthesized environment instance security state is set to a clean value as depicted in block 1.3.1117. Block 1.3.1118 depicts the lifting of the process suspension for the newly migrated process on the live forensics synthesized environment instance and execution of both authorized and unauthorized process is restored. Block 1.3.119 depicts the study and analysis and experimentation that can be done to unauthorized processes that are now in the live forensics virtual machine. Again, this is performed without alerting the unauthorized process or its controller to the fact that it has been moved one instance to another for execution first being quarantined and then being put in a controlled synthetic environment. Alternately, if the live forensics mode is off and the virtual machine is being refreshed, the migration process completes as depicted at block 1.3.1120. Block 1.3.1121 depicts the new destination virtual machine that was created as part of the temporal refresh migration process, which is detailed in FIG. 11, including block 1.3.1202.

Block 1.3.1123 of FIG. 13 depicts the quarantine being lifted on the newly created destination virtual machine by having its security integrity value as tracked by the Virtual Machine Manager (1.3.200 in FIG. 5) set to clean which is depicted in FIG. 13 at block 1.3.1122.

Block 1.3.1124 depicts a state snapshot being taken by the State Mapper (1.3.900 in FIG. 5) of the quarantined virtual machine just before it is terminated, as detailed in the flow chart diagram in FIG. 7. The final step of the quarantine process is to store a copy of the quarantined instance snapshot for forensic analysis as depicted with block 1.3.1125 in FIG. 13.

Figure 14:
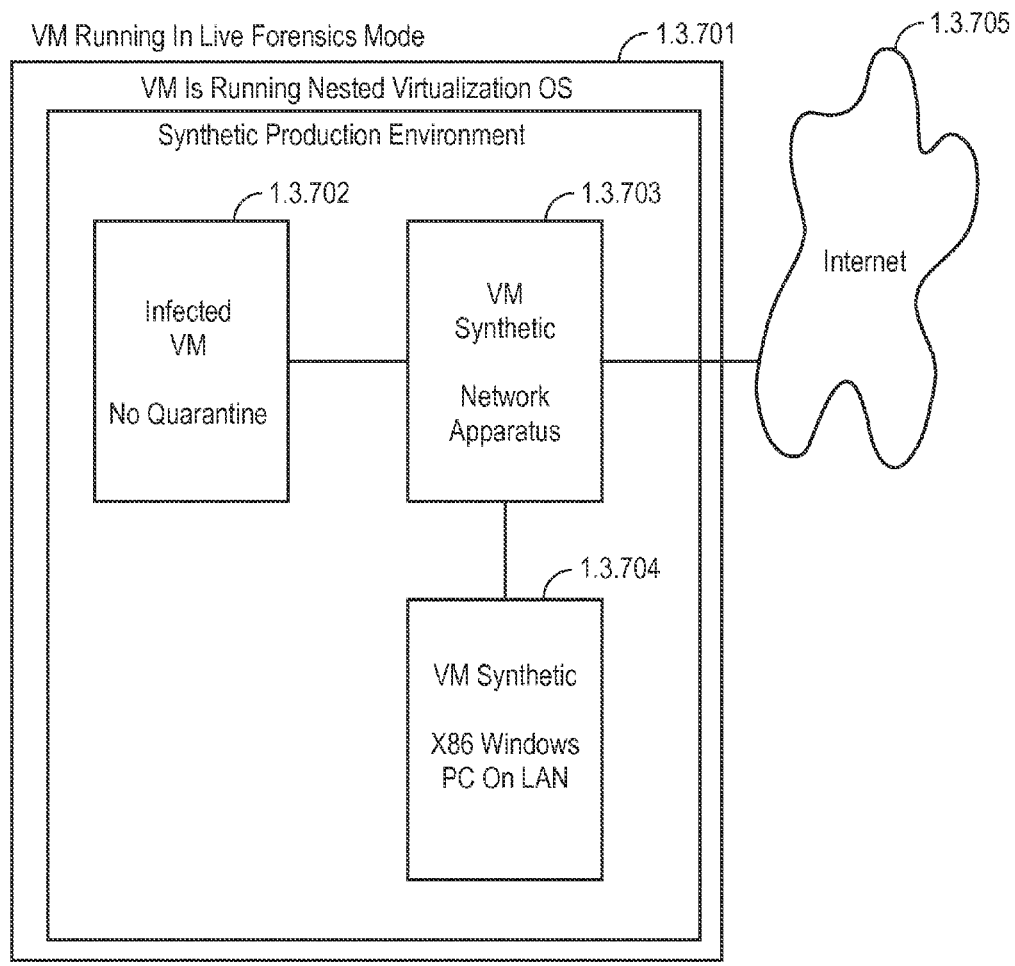
FIG. 14 is a conceptual view of an example of a real system in which a synthetic pseudo representation of a computing environment can replicate a production system environment from the prospective of the computing process.

FIG. 14 illustrates a synthesized production system utilized in accordance with an embodiment of the invention. A virtual machine running live forensic mode may include a virtual machine with a nested virtualization operation system 1.3.701. This may include a synthetic production environment with an infected virtual machine without quarantine 1.3.702, a synthetic virtual machine for a network apparatus 1.3.703 and a synthetic virtual machine for a personal computer 1.3.704. Instances maybe swapped by using resources on internet 1.3.705.

Figure 15:
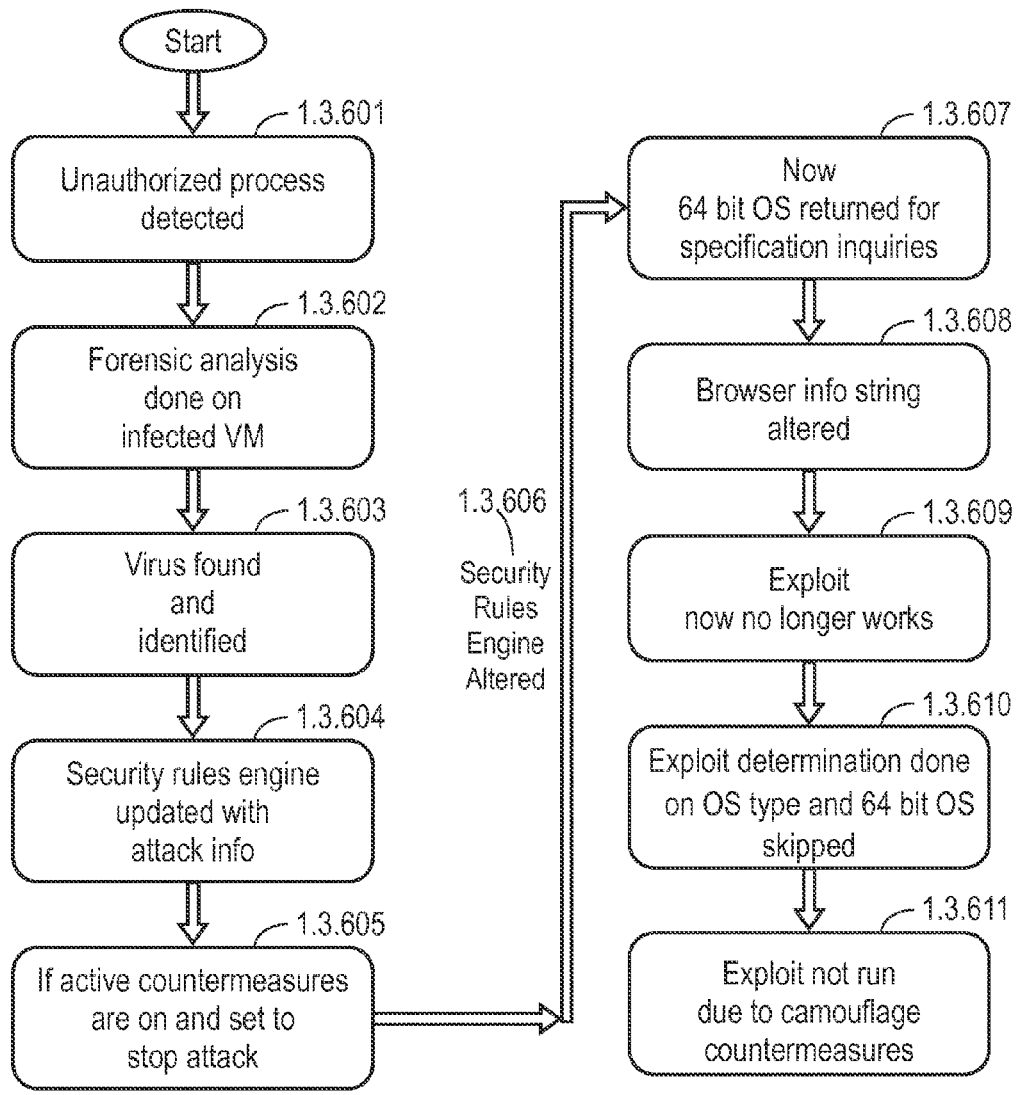
FIG. 15 is a flow chart showing how a procedure for real-time countermeasure adjustments as determined through forensic analysis of infected computing systems can operate in accordance with an embodiment of the invention.

FIG. 15 steps through the real time countermeasures process by using a real world example of a system being hacked and infected with agent code that runs as an unauthorized process. In the example a virtual machine running in the temporal environment as detailed in the present invention is running an authorized web browser application. The web browser is exploited by a hacker who determines that the web browser is IE running in a 32 bit windows environment which was determined by malicious code that was placed on a website by the hacker. The virtual machine running the authorized web browser application is running a 32 bit version of the Windows operating system. The vulnerability for the exploit was a memory overflow vector that affects the IE web browser when running on 32 bit versions of the Windows operating system. This is a very typical browser exploit that is used frequently to gain unauthorized access into a computer system. Once the memory overflow was exploited shell code was loaded for execution again by the malicious code placed on the website that was being browsed. The shell code is a virus or agent code that allows the hacker unauthorized remote access to the machine. During the temporal migration process that the virtual machine undergoes an unauthorized process, in this case the agent code, was detected as depicted in FIG. 15 with block 1.3.601. The security rules were such that unauthorized processes were to be terminated and the infected virtual machine snapshot was to undergo an autopsy to determine what the infection was and report it to the Security Rules Engine (1.3.600 in FIG. 5) to apply active countermeasures against recent successful attacks. Block 1.3.602 depicts the forensics analysis being conducted on the infected virtual image snapshot. Block 1.3.603 depicts the analysis concluding that an unauthorized access agent had been placed on the system and most likely this was done through the browser. Block 1.3.604 depicts the forensics application notifying the Security Rules Engine of the discovery. Based on the active countermeasure rules applied at block 1.3.605, when an exploit has recently succeeded on the virtual machine the camouflage features of the System Specifications Handler is altered such that the operating system version is to be changed from its true value of 32 bit to 64 bit for authorized applications that include the IE browser application as depicted with path 1.3.606. The next time the browser application does a systems inquiry as to the operating system's specifications the result returned is 64 bit Windows operating system as shown with block 1.3.607. The next time the browser visits the site that the hacker placed malicious code on the exploit used to infect the system last time will not work as the malicious code only works for 32 bit Windows operating systems. The browser reports, as shown with block 1.3.608, that the information string is altered. Therefore the exploit no longer works 1.3.609 and the 64 bit OS is skipped 1.3.610. Consequently, the exploit is not run due to camouflage countermeasures 1.3.611. This example shows a real world example of the temporal system using real time countermeasures to increase security making the system less vulnerable to recently detected attacks.

FIG. 16 illustrates exemplary data that may be collected in accordance with an embodiment of the invention. In particular, the figure illustrates a base virtual machine image record in an archive, which includes columns for virtual machine base image identification, hardware identification, virtual machine digital identity and virtual machine base image object.

FIG. 17 illustrates exemplary data that may be collected in accordance with an embodiment of the invention. In particular, the figure illustrates authorized process information in a registry, which includes columns for authorized process identification, a virtual machine base image identification, a process filename, an authorization hash and a process executable object.

Those skilled in the art will recognize many advantages associated with the disclosed technology. In its most basic form the technology reduces unauthorized computer access and use. The technology reduces the number of potential hackers by increasing the skill level needed to penetrate and control a computer device or network. The technology confounds and confuses would be attackers as to what the specifications of the computer device or network are. Thus, the cost of gaining unauthorized access and use of computer devices and networks is increased.

The technology reduces the current asymmetric nature of cyber attacks. The technology also slows the spread of viruses when a computing device on a network becomes infected. The technology reduces the duration a virus or unauthorized agent code or unauthorized computing session exists on an infected computing device.

The technology reduces the time window a virus or unauthorized agent code or unauthorized computing session has to execute malicious commands. The technology also provides countermeasures to attacks. Thus, the technology facilitates a stable standard computing environment throughout a random or haphazard refresh cycle (instantiation, re-instantiation and de-instantiation) or cycles of the computer devices, networks and systems.

The technology facilitates the seamless migration between computing devices and networks of mission critical processes avoiding interruption of service or replaying of commands. The technology also allows a migration path to the new security methodology of legacy systems as an alternative to system replacement. The technology avoids Denial Of Service attacks. The technology stores system states in a way that allows for future forensic reconstruction and live specimen analysis of virus and agent infected systems as well as unauthorized use sessions.

The technology allows one to move contained infected computing devices and networks from production to a non-production computing environment without detection by the virus, the unauthorized agent code or the unauthorized computer session user or the party that is remotely controlling them. The technology also provides a synthetic or pseudo production environment that infected computing devices and networks can operate in whereby the virus, the unauthorized agent code or unauthorized session computing user or their respective controllers cannot determine that the computing environment is not the production environment. The synthetic or pseudo production environment that infected computing devices and networks can operate in and spread can be safely evaluated to determine the threat level, propagation rate and polymorphic attributes of a virus or unauthorized agent code.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   introducing computer generated dynamic temporal disruptions to the operating states of both an authorized process and an unauthorized process; and
   migrating the authorized process to a virtual machine for ongoing operation without exposure to the dynamic temporal disruptions while the unauthorized process is subject to ongoing operation with exposure to the dynamic temporal disruptions and thereby experiences an unstable environment that induces operating faults.

2. The computer implemented method of claim 1 wherein introducing dynamic temporal disruptions includes passing false parameters to processes.

3. The computer implemented method of claim 1 further comprising:
   creating a representation of a digital resource;
   forming a unique value for the representation to establish an integrity value for the digital resource;
   receiving a current instantiation of the digital resource;
   converting the current instantiation to an active integrity state; and
   identifying a mismatch between the integrity value and the active integrity state to identify the unauthorized process associated with the current instantiation of the digital resource.

4. The computer implemented method of claim 1 further comprising creating a registry of authorized processes.

5. The computer implemented method of claim 1 further comprising specifying a termination time for an authorized process, wherein the termination time is unknown to the authorized process.

6. The computer implemented method of claim 5 further comprising invoking, at the termination time, a new instantiation of the authorized process.

7. The computer implemented method of claim 6 further comprising migrating the authorized process onto a new instantiation of the digital resource, wherein migrating includes invoking a registered authorized process corresponding to the authorized process.

8. The computer implemented method of claim 1 further comprising quarantining the unauthorized process.

9. The computer implemented method of claim 1 wherein the unauthorized process is precluded from making changes to system settings, accessing shared resources and viewing true system specifications.

10. The computer implemented method of claim 1 further comprising forming a quarantined instantiation of the unauthorized process, wherein the quarantined instantiation of the unauthorized process is operated in an invisible synthetic virtualized simulation outside a production environment.

11. The computer implemented method of claim 10 further comprising performing forensic analysis on the quarantined instantiation of the unauthorized process.

12. The computer implemented method of claim 1 further comprising:
    categorizing the unauthorized process;
    providing a threat level quantification to the unauthorized process; and
    determining a countermeasure to the unauthorized process.

13. The computer implemented method of claim 3 wherein the representation of the digital resource includes a representation of a first virtual machine, a second virtual machine, a temporal defense layer, a virtualization operating system, device drivers and computer hardware.

14. The computer implemented method of claim 13 wherein forming a unique value for the representation includes computing a hash of executable code processed by the digital resource.

15. The computer implemented method of claim 13 wherein forming a unique value for the representation includes computing a hash for an authorized process based upon an image identification, a process name, and selected header information associated with the process.

16. The computer implemented method of claim 13 wherein forming a unique value for the representation includes computing a hash for a virtual machine based upon a virtual machine archive identification number, an operating system name, an operating system version, operating system services process names and authorized processes registered to run on the virtual machine.

17. The computer implemented method of claim 1 further comprising invoking a security rules engine, a synthetic environment simulator, a virtualization operating system and an integrity checker.

18. The computer implemented method of claim 1 further comprising invoking an inter-process communications gateway, a quarantine enforcer, and a state mapper.

19. The computer implemented method of claim 1 further comprising invoking a temporal scheduler, a virtual machine manager, an authorized process registry and a base virtual machine image archive.

* * * * *